United States Patent
Donovan

(10) Patent No.: US 11,000,822 B2
(45) Date of Patent: May 11, 2021

(54) MODIFIED CLAY SORBENTS AND METHODS OF SORBING PFAS USING THE SAME

(71) Applicant: Specialty Minerals (Michigan) Inc., Bingham Farms, MI (US)

(72) Inventor: Michael Donovan, Huntley, IL (US)

(73) Assignee: Specialty Minerals (Michigan) Inc., Bingham Farms, MI (US)

( * ) Notice: Subject to any disclaimer, the term of this patent is extended or adjusted under 35 U.S.C. 154(b) by 0 days.

(21) Appl. No.: 16/882,143

(22) Filed: May 22, 2020

(65) Prior Publication Data

US 2020/0368717 A1    Nov. 26, 2020

Related U.S. Application Data

(60) Provisional application No. 62/851,431, filed on May 22, 2019.

(51) Int. Cl.
| | | |
|---|---|---|
| *B01J 20/12* | (2006.01) | |
| *C02F 1/28* | (2006.01) | |
| *B01J 20/32* | (2006.01) | |
| *C02F 101/36* | (2006.01) | |
| *C02F 103/06* | (2006.01) | |

(52) U.S. Cl.
CPC ........... *B01J 20/12* (2013.01); *B01J 20/3246* (2013.01); *C02F 1/288* (2013.01); *C02F 2101/36* (2013.01); *C02F 2103/06* (2013.01)

(58) Field of Classification Search
CPC ........ B01J 20/12; B01J 20/3246; C02F 1/288; C02F 2101/36; C02F 2103/06
See application file for complete search history.

(56) References Cited

U.S. PATENT DOCUMENTS

| | | | |
|---|---|---|---|
| 4,444,665 A | 4/1984 | Hildebrandt | |
| 6,261,459 B1 * | 7/2001 | Waldmann | ............ C02F 1/5245 210/666 |
| 6,262,162 B1 | 7/2001 | Lan et al. | |
| 2015/0129504 A1 * | 5/2015 | Kaplan | .................... B01J 20/10 210/682 |

FOREIGN PATENT DOCUMENTS

| | | |
|---|---|---|
| EP | 0474386 A2 | 3/1992 |
| WO | WO-2008/033273 A1 | 3/2008 |
| WO | WO-2010/065996 A1 | 6/2010 |
| WO | WO-2011/069189 A1 | 6/2011 |

OTHER PUBLICATIONS

International Application No. PCT/US2020/034219, International Search Report and Written Opinion, dated Oct. 7, 2020.
Seki et al., Preparation and vapor adsorption properties of quaternary diammonium-montmorillonites, Microporous and Mesoporous Materials, 124(1-3):30-35 (2009).

* cited by examiner

*Primary Examiner* — Dirk R Bass
(74) *Attorney, Agent, or Firm* — Marshall, Gerstein & Borun LLP

(57) ABSTRACT

A method of sorbing a PFAS compound from a contaminated environment can include admixing a modified clay sorbent with the environment. The modified clay can include a clay intercalated with a blend of mono-quaternary amine compound and di-quaternary amine compound.

30 Claims, 8 Drawing Sheets

MODIFIED CLAY SORBENTS AND METHODS OF SORBING PFAS USING THE SAME

CROSS-REFERENCE TO RELATED APPLICATION

This application claims the benefit of priority of U.S. Provisional Patent Application No. 62/851,431 filed May 22, 2019, the disclosure of which is incorporated herein by reference in its entirety.

BACKGROUND

Field of the Disclosure

The disclosure relates to methods of sorbing PFAS compounds, and in particular sorbing PFAS compounds using a clay modified with one or more di-functional quaternary amine compounds.

Brief Description of Related Technology

Perfluorinated compounds (PFCs) have wide application and as a result have become a global concern in contamination of water environments. Per- and polyfluoroalkyl substances (conventionally referred to collectively as PFAS) are a group of man-made chemicals that includes PFOA, PFOS, GenX, and many other chemicals. PFAS have been manufactured and used in a variety of industries, including in the United States since the 1940s. Perfluorooctane sulfonate (PFOS) is one of the typical PFCs and has been used in many industries as surfactants, fire retardants, lubricants, and polymer additives. Perfluorooctanoic acid (PFOA) and PFOS have been the most extensively produced and studied of these chemicals. PFCs can accumulate over time in the human body and many do not naturally break down. PFAS exposure has been demonstrated to be detrimental to human health. PFC removal from waste water sources is critical to the prevention of contamination of natural waterways. Since PFCs are generally very stable, they are difficult to decompose in ambient environments using some conventional technologies including bio-logical degradation, oxidation and reduction. Sorption has been used as an alternative method to effectively remove PFCs from wastewater, soil, and other contaminated sources with conventional sorbents including activated carbon, resin, and biosorbents.

SUMMARY

There is a need for improved methods of sorbing PFAS compounds from soils, wastewaters and other contaminated sources.

A modified clay sorbent in accordance with the disclosure can include a clay intercalated with one or more di-quaternary amine compounds and one or more mono-quaternary amine compounds, wherein the one or more di-quaternary amine compounds are present in a mole percent of about 25 mol % to about 95 mol % based on total moles of quaternary amine compounds present in the modified clay sorbent.

A modified clay sorbent in accordance with the disclosure can include a first modified clay comprising a clay intercalated with the one or more mono-quaternary amine compounds; and a second modified clay comprising a clay intercalated with the one or more di-quaternary amine compounds. The second modified clay can be present in the modified clay sorbent in an amount such that the one or more di-quaternary amine compounds are present in an amount of about 25 mol % to about 95 mol % based on total moles of quaternary amine compounds present in the modified clay sorbent.

A method of sorbing PFAS compounds from a contaminated sample or environment in accordance with the disclosure can include admixing a modified clay sorbent with the sample or environment, wherein the modified clay sorbent comprises a clay intercalated with one or more di-quaternary amine compounds, wherein the di-quaternary amine compound is dequalinium chloride and/or a compound of formula (I)

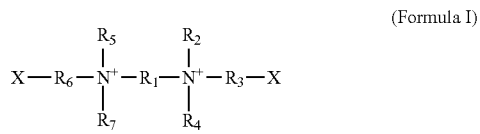
(Formula I)

wherein X is chloride and $R_1$ is an aliphatic radical having 1 to 13 carbons, and $R_2$, $R_3$, $R_4$, $R_5$, $R_6$, and $R_7$ are independently selected from aliphatic radicals and aromatic radicals, and at least one of $R_2$, $R_3$, $R_4$, $R_5$, $R_6$, and $R_7$ is an aliphatic radical or aromatic radical having 8 or more carbons.

A method of sorbing PFAS compounds from a contaminated sample or environment in accordance with the disclosure can include admixing a modified clay sorbent with the sample, wherein the modified clay sorbent comprises a clay intercalated with a one or more mono-quaternary amine compounds and one or more di-quaternary amine compounds, and the one or more di-quaternary amine compounds are present in an amount of about 25 mol % to about 95 mol % based on the total mole percent of the quaternary amine compounds in the modified clay sorbent.

A method of sorbing PFAS compounds from a contaminated sample or environment can include admixing a modified clay sorbent with the sample or environment, wherein the modified clay sorbent comprises a first modified clay comprising a clay intercalated with a one or more mono-quaternary amine compounds and a second modified clay comprising a clay intercalated with one or more di-quaternary amine compounds, wherein a ratio of an amount of the first modified clay to the amount of the second modified clay is selected such that the one or more di-quaternary amine compounds are present in an amount of about 25 mol % to about 95 mol % based on the total mole percent of the quaternary amine compounds admixed with the sample or environment.

DETAILED DESCRIPTION

Figure 1:
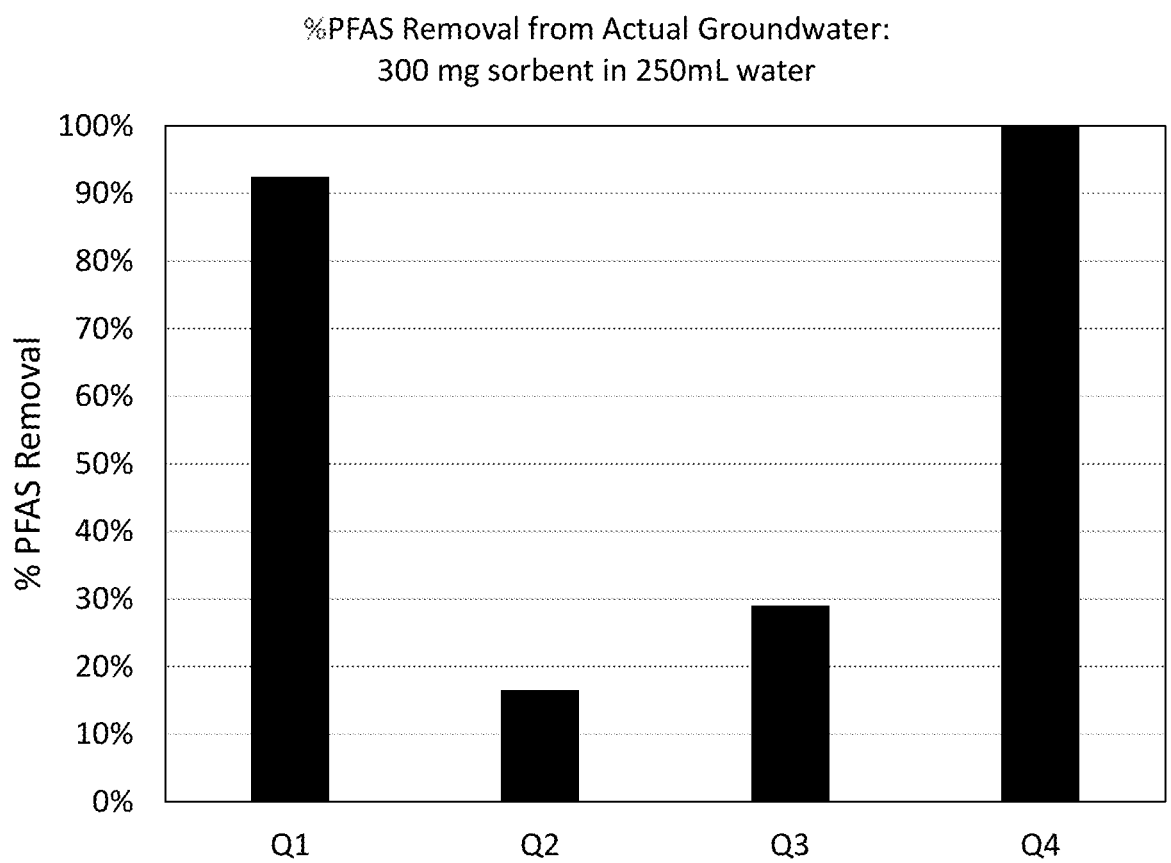
FIG. 1 is a graph showing the percent PFAS removal from ground water by compounds in accordance with the disclosure and comparative compounds.

Modified clay sorbents are disclosed herein for sorbing PFAS compounds. In accordance with embodiments, the modified clay sorbents include a clay component modified with a blend of one or more mono-quaternary amine compounds and one or more di-quaternary amine compounds. In embodiments, the modified clay sorbent can be modified with one or more di-quaternary amine compounds. In embodiments, a method of sorbing PFAS compounds from a contaminated sample or environment can include contacting or otherwise exposing the sample or environment to one or more modified clay sorbents. In such embodiments, the modified clay sorbent can be modified with a di-quaternary amine compound or with a blend of a mono-quaternary amine compound and a di-quaternary amine compound. In any of the embodiments herein, the clay can be modified with more than one mono-quaternary amine compounds and/or more than one di-quaternary amine compounds. It has advantageously been found that the modified clay sorbents and methods of sorbing PFAS compounds in accordance with the disclosure can have improved PFAS sorbent capacity and/or efficiency. Further, the modified clay sorbents of the disclosure can effective sorb PFAS in the presence of co-contaminants such as oils.

Modified clay sorbents in accordance with embodiments of the disclosure can be made by reacting a clay with one or more quaternary amine compounds or blend of quaternary amine compounds. The reaction is done under conditions to intercalate the clay with the one or more quaternary amine compounds. In accordance with embodiments, the modified clay sorbent can include a clay intercalated with one or more mono-quaternary amine compounds and one or more di-quaternary amine compounds. In embodiments, the modified clay sorbent can include a clay intercalated with one or more di-quaternary amine compounds. In accordance with embodiments, a modified clay sorbent blend can include a blend of a first clay intercalated with one or more mono-quaternary amine compounds and a second clay intercalated with one or more di-quaternary amine compounds.

Modification of a clay to intercalate a quaternary amine compound can be done according to any know methods in the art, including wet processing methods and dry, extrusion based methods. In embodiments, the reaction can include mixing approximately 1 molecule of quat per exchangeable cation in the clay. For example, the quaternary amine compound or compound blends can be mixed with water and then clay can be added to the mixture to react the clay with the multi-functional quaternary amine compounds. The mixture can then be dried and ground into granules or a powder for use.

The sorbents of the disclosure should be understood as agents that can bind, immobilize, or otherwise associate with a contaminant via sorption of the contaminant to the modified clay sorbent. "Sorption" as referred to herein should be understood to include adsorption of the contaminant to the surface of the sorbent and/or absorption of the contaminant into all or part of the sorbent.

In any of the embodiments disclosed herein, the clay can be phyllosilicates, such as smectite clay minerals, e.g., montmorillonite, particularly sodium montmorillonite; magnesium montmorillonite and/or calcium montmorillonite; attapulgite, heat treated attapulgite, nontronite; beidellite; volkonskoite; hectorite; saponite; sauconite; sobockite; stevensite; svinfordite; vermiculite; palygorskite; kaolinite; sepiolite and the like. Other useful layered materials include micaceous minerals, such as illite, clintonite, muscovite, biotite and the like and mixed layered illite/smectite minerals, such as rectorite, tarosovite, ledikite and admixtures of illites with the clay minerals named above.

In embodiments, the swellable layered materials are phyllosilicates of the 2:1 type having a negative charge on the layers ranging from about 0.15 to about 0.9 charges per formula unit and a commensurate number of exchangeable metal cations in the interlayer spaces. Most preferred layered materials are smectite clay minerals such as montmorillonite, nontronite, beidellite, volkonskoite, hectorite, saponite, sauconite, sobockite, stevensite, and svinfordite.

Modified Clay Sorbent with Mono-Quaternary and Di-Quaternary Blend and Modified Clay Sorbent Blends In embodiments, the modified clay sorbents include a clay intercalated with a blend of one or more mono-quaternary amine compounds and more or more di-quaternary amine compounds. A modified clay sorbent can also or alternatively be provided having a first modified clay with a clay intercalated with one or more mono-quaternary amine compounds and a second modified clay with a clay intercalated with one or more di-quaternary amine compounds. The modified clay sorbent having the first and second modified clays can be provided as a single blended composition or as separate components to be added to a contaminated source. Contaminated sources are also interchangeably referred to herein as contaminated samples and contaminated environments. It is further contemplated herein that the modified clay sorbent having the first and second modified clays can include a further clay intercalated with a blend of one or more mono-quaternary amine compounds and one or more di-quaternary amine compounds. Modified clay sorbents in accordance with the disclosure can include any suitable number of modified clay components, including, for example, multiple clay components intercalated with blends of mono-quaternary and di-quaternary amine compounds at different mono- to di-quaternary amine compound ratios. Further, modified clay sorbents with the disclosure can include unmodified clay. The modified clay sorbents of the disclosure can be provided with all or some of the components pre-blended for single addition to a contaminated source for PFAS removal. Alternatively, one or more of the components can be provided for separate addition to the contaminated source. In embodiments, the modified clay sorbent, whether a single component blend, a single clay component modified with a blend of quaternary amine compounds, or a separate components, can consist of one or more di-quaternary amine compounds and one or more mono-quaternary amine compounds. That is, the sorbent can include only di-functional and mono-functional quaternary amine compounds.

It has advantageously been found that inclusion of about 25 mol % to about 95 mol % of di-quaternary amine compound based on the total moles of quaternary amine compound in the modified clay sorbent significantly improves removal of PFAS compounds, and particularly removal of long-chain PFAS compounds, short-chain PFAS compounds, and current commonly regulated PFAS compounds. In embodiments in which the modified clay sorbent is provided as separate components, the components are added to the contaminated sample or environment such that the amount of di-quaternary amine compound is about 25 mol % to about 95 mol % based on the total moles of quaternary amine compound added to the contaminated sample or environment. As used herein "long-chain PFAS compounds" refers to PFAS compounds having 6 or more carbons. As used herein "short-chain PFAS compounds" refers to PFAS compounds having less than 6 carbons. As used herein "regulated PFAS compounds" includes perfluorononanoic acid (PFNA), perfluorooctanoic acid (PFOA), perfluorooctane sulfonic acid (PFOS), perfluorohexane sulfonic aicd (PFHxS), and perfluoroheptanoic acid (PFHpA).

In embodiments, the modified clay sorbent includes one or more di-quaternary amine compound in a molar amount based on the total amount of quaternary amine compound in the sorbent of about 25 mol % to about 95 mol %, about 30 mol % to about 70 mol %, about 25 mol % to about 50 mol %, about 30 mol % to about 50 mol %, about 25 mol % to about 40 mol %, about 25 mol % to about 30 mol %. Other suitable amounts of di-quaternary amine compound include about 25, 26, 27, 28, 29, 30, 31, 32, 33, 34, 35, 36, 37, 38, 39, 40, 41, 42, 43, 44, 45, 46, 47, 48, 49, 50, 52, 54, 56, 58, 60, 62, 64, 66, 68, 70, 72, 74, 76, 78, 80, 82, 84, 86, 88, 90, 92, 94, and 95 mol %. In applications in which the presence of extractables from a sorbent is disadvantageous, it can be useful to limit the amount of di-quaternary amine compounds to an upper limit of about 50 mol %.

The modified clay sorbents or modified clay sorbent blends of the disclosure were advantageously found to have high PFAS removal capacity and efficiency. This improvement in PFAS removal capacity and efficiency can allow for less sorbent to be utilized for removal of the same or substantially the same percentage of PFAS from a contaminated source, as compared to a conventional clay sorbent using mono-quaternary amine compound. Further, the improved removal efficiency can allow for high flow rates of material to be pumped through the modified clay sorbents and modified clay sorbent blends of the disclosure, improving overall plant efficiency.

Without intending to be bound by theory, it is believed that the combination of the mono-quaternary amine compound and the di-quaternary amine compounds introduces an electrostatic force between the clay platelets that can allow the PFAS better access to the interior of the sorbent material. This, along with the hydrophobicity, provided by the quaternary amine compounds and particularly the mono-quaternary amine compound is believed to result in the improvement in both sorbent capacity and efficiency. Furthermore, it is believed that the inclusion of the di-quaternary amine compound, which is more hydrophilic than the mono-quaternary amine compound, can improve sorption of short chain PFAS molecules, which may be attracted to the more hydrophilic component of the sorbent. Thus, balancing the amounts of mono-quaternary amine compound and di-quaternary amine compound as disclosed herein can provide improvement of sorption of total anionic PFAS molecules. At levels below about 25 mol %, the attractive electrostatic contribution provided by the di-quaternary amine compound is not strong enough to show a benefit. At levels above 50 mol %, the modified clay sorbents having both mono-quaternary amine compounds and di-quaternary amine compounds had increasing amounts of extractables, which can undesirable in some removal applications. In embodiments in which extractables are of no concern, an upper limit of 95 mol % di-quaternary amine compounds can be used. Further, without intending to be bound by theory, it is believed that amounts of di-quaternary amine compounds above 95% mol percent could result in a decrease of the hydrophobicity of the surface of the clay, which reduces the hydrophobic attractive forces for sorption of the PFAS molecules. Also, the inclusion of higher molecular weight, longer chain mono-quaternary amine compounds may reduce the tendency for bridging between the clay platelets due to the imparted steric hindrance by the mono-quaternary amine compounds.

It has further been found advantageous to intercalate the clay with the quaternary amine compounds to at least about 50% of the cationic exchange capacity of the clay. For example, the clay can be intercalated to about 50% to about 120%, about 80% to about 100%, about 60% to about 90%, or about 75% to about 115% of the CEC of the clay. Other suitable values include about 50, 52, 54, 56, 58, 60, 62, 64, 66, 68, 70, 72, 74, 76, 78, 80, 82 84, 86, 88, 90, 92, 94, 96, 98, 100, 102, 104, 106, 108, 110, 112, 114, 116, 118, and 120% CEC. In embodiments in which the modified clay sorbent includes a first clay intercalated with a mono-quaternary compound and a second clay intercalated with one or more di-quaternary compounds, the first and second clays can be intercalated to the same or different CEC.

Figure 3:
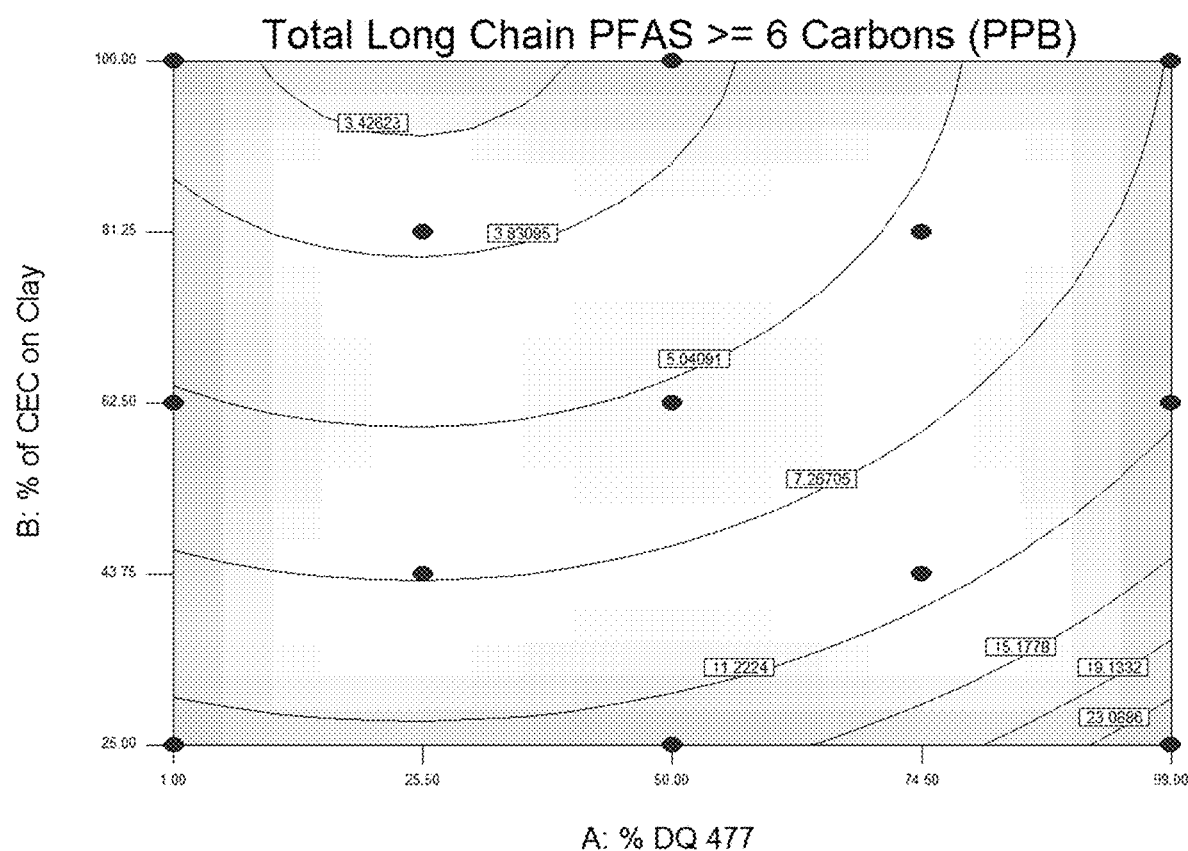
FIG. 3 is a contour map of a model of PFAS sorption performance showing sorption of long-chain PFAS as tested in the actual groundwater sample.
Figure 4:
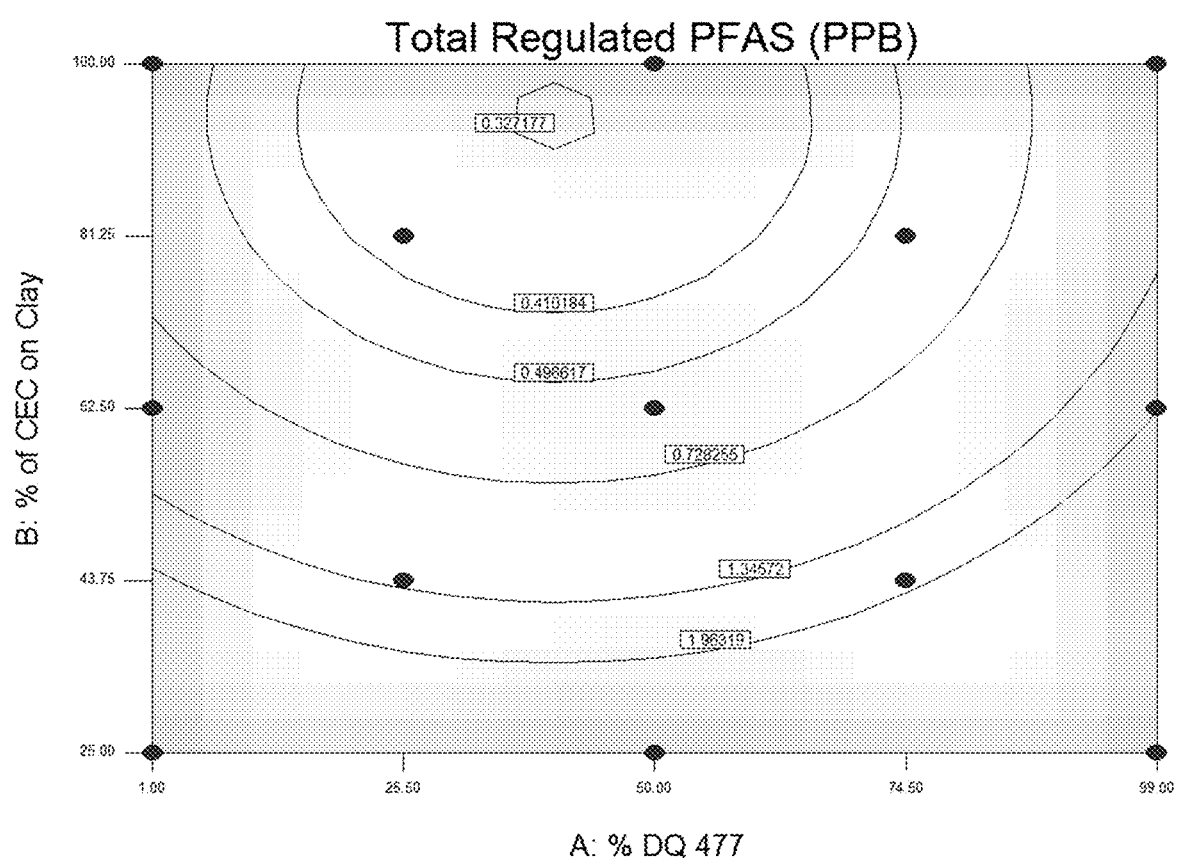
FIG. 4 is a contour map of a model of PFAS sorption performance showing sorption of current commonly regulated PFAS as tested in the actual groundwater sample.
Figure 5:
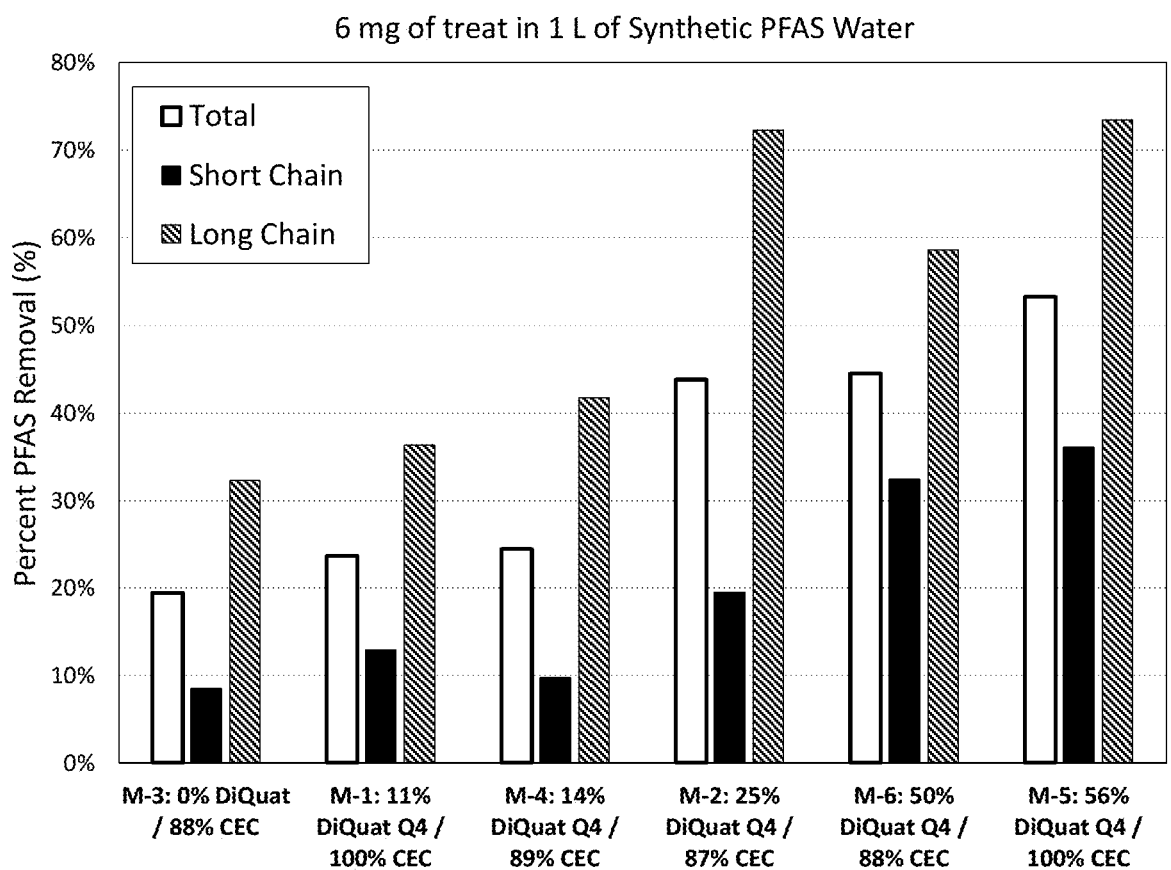
FIG. 5 is a graph showing PFAS sorption, including total PFAS, long chain PFAS, and short chain PFAS, expressed as percent PFAS removal as tested in the actual groundwater sample.
Figure 6:
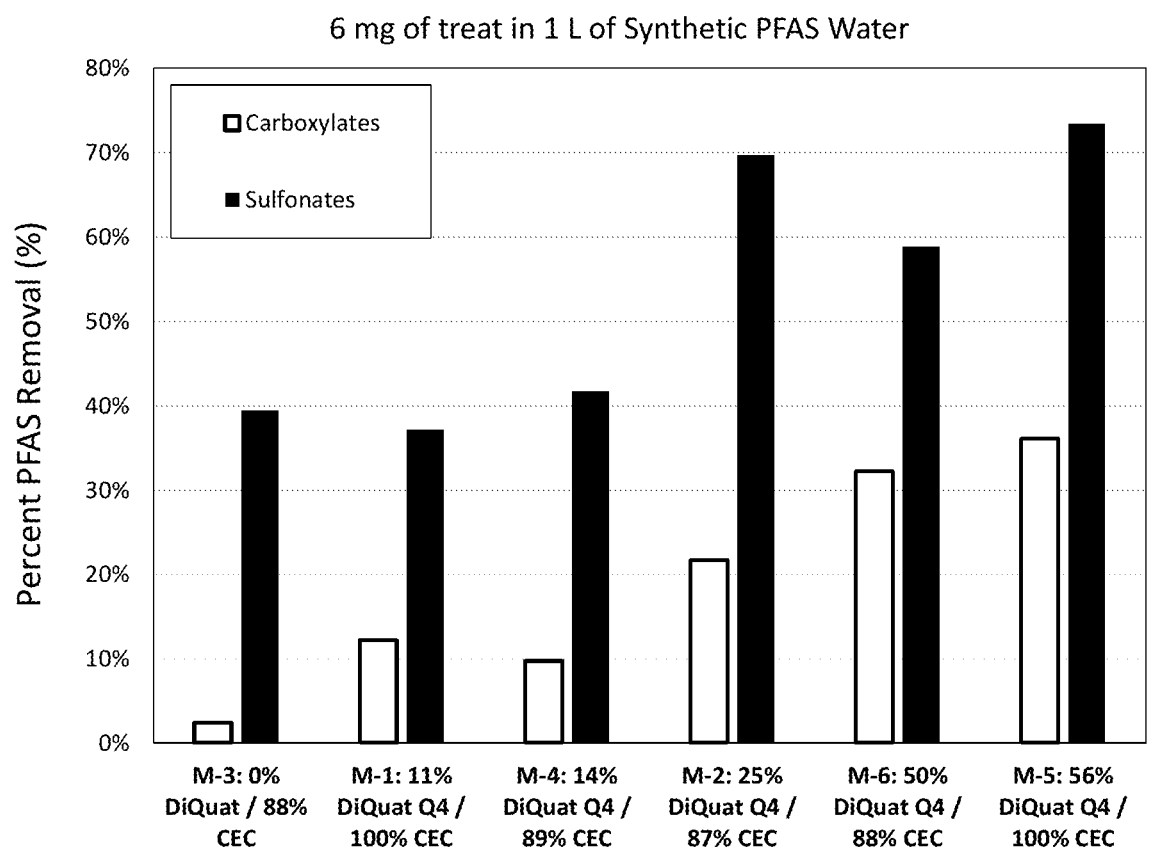
FIG. 6 is a graph showing comparative PFAS sorption, comparing sorption of carboxylated PFAS and sulfonated PFAS expressed as a percentage of PFAS removal as tested in the lab prepared PFAS water.
Figure 7:
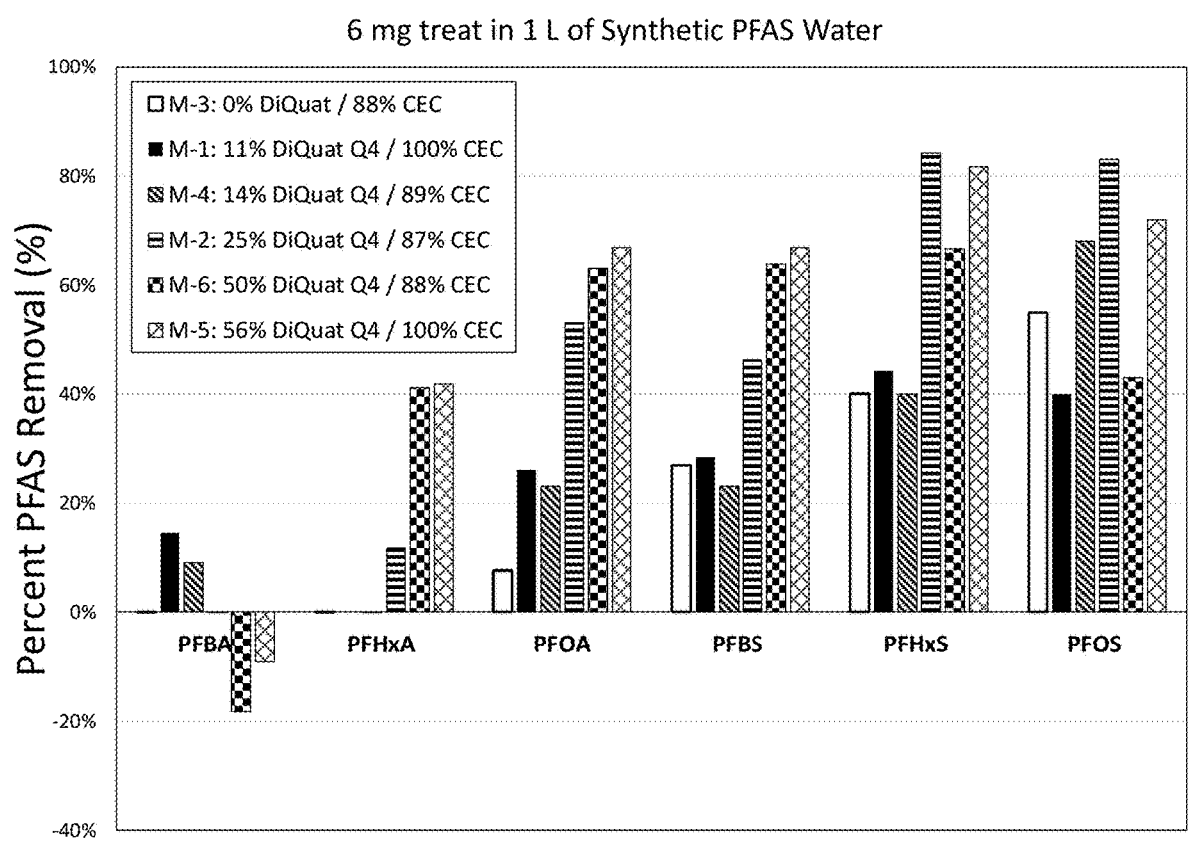
FIG. 7 is a graph showing comparative PFAS sorption, comparing sorption of selected carboxylated PFAS and sulfonated PFAS expressed as a percentage of PFAS removal as tested in the lab prepared PFAS water.

FIGS. 3 and 4 are contour graphs of an analysis of variance (ANOVA) model based on the shaker testing described in detail below in Example 3. FIG. 3 is a contour plot of the sorption of long chain PFAS molecules. The model had an $R^2$ value of 0.9469, and an adjusted $R^2$ 0.9204, which demonstrates the model represent a good fit to the data. FIG. 4 is a contour plot of the sorption of regulated PFAS molecules, which includes both short chain and long chain PFAS. The model had an $R^2$ value of 0.8892, and an adjusted $R^2$ 0.8337, which demonstrates the model represent a good fit to the data. These figures illustrate the beneficial improvement in sorption for the modified sorbents and blends having 25 to 95 mol % di-quaternary amine compound. As illustrated by the models, the inventors have found a significant interaction between performance and the amount of di-quaternary amine compound present based on the total amount of quaternary amine compound in the sorbent, which were previously unknown and unexpected in the art.

In embodiments, the di-quaternary amine compound can be a di-quaternary amine compound having at least 18 carbons. It has advantageously been found that di-quaternary amine compounds with small head groups and hydrophobicity function well in combination with mono-quaternary amine compounds in the modified clay sorbents to significantly increase removal efficiency and capacity of the modified clay sorbents.

For example, the modified clay sorbent can include as the or one of the di-quaternary amine compounds dequalinium chloride (referred to herein as Q1):

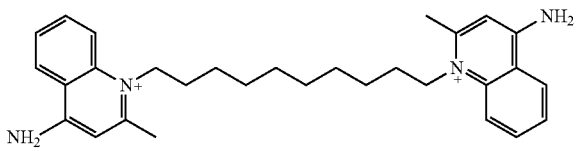

For example, the modified clay sorbent can include as the or one of the di-quaternary amine compounds a compound of formula (I):

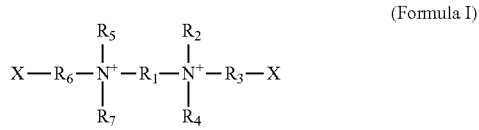

wherein X is chloride and $R_1$ is an aliphatic radical having 1 to 13 carbons, and $R_2$, $R_3$, $R_4$, $R_5$, $R_6$, and $R_7$ are independently selected from aliphatic radicals and aromatic radicals, and at least one of $R_2$, $R_3$, $R_4$, $R_5$, $R_6$, and $R_7$ is an aliphatic radical or aromatic radical having 8 or more carbons. Optionally, the at least one of $R_2$, $R_3$, $R_4$, $R_5$, $R_6$, and $R_7$, can be an aliphatic tallow radical. For example, each of $R_2$, $R_3$, $R_4$, $R_5$, and $R_7$ can be method and $R_6$ can be an aliphatic tallow radical.

For example, the di-quaternary amine compound can be a compound of formula (II) (referred to herein as Q4):

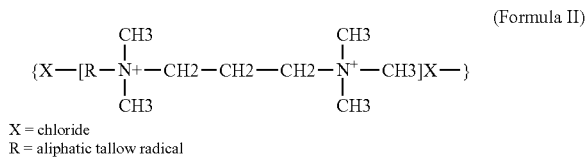

X = chloride
R = aliphatic tallow radical

For example, the compound of formula I can be Tallow Diamine pentamethyl propylene diammonium hydrochloride (57%).

Other suitable di-quaternary amine compounds can include one or more of 1,3-Propanediaminium, N1,N3-didodecyl-2-hydroxy-N1,N1,N3,N3-tetramethyl-, chloride (1:2), 4-Aza-1-azoniabicyclo[2.2.2]octane, 1,1'-(1,10-decanediyl)bis-, bromide (1:2), Poly[(dimethyliminio)-2-butene-1,4-diyl chloride (1:1)], α-[4-[tris(2-hydroxyethyl)ammonio]-2-buten-1-yl]-ω-[tris(2-hydroxyethyl)ammonio]-, chloride (1:2), Boron, tetrahydro[μ-(N1,N1,N2,N2-tetramethyl-1,2-ethanediamine-κN1:κN2)]bis[(1R,2S,3R,5R)-2,6,6-trimethylbicyclo[3.1.1]hept-3-yl]di-; Boron, tetrahydro[μ-(N1,N1,N2,N2-tetramethyl-1,2-ethanediamine-κN1:κN2)]bis[rel-[1R,2S,3R,5R)-2,6,6-trimethylbicyclo[3.1.1]hept-3-yl]di-; PolyRdimethyliminio)-1,3-propanediyl(dimethyliminio)-1,6-hexanediyl bromide (1:2)]; 1-Azoniabicyclo[2.2.2]octane, 1,1'-(1,6-hexanediyl)bis[3-(phenylmethyl)-, dichloride (9Cl); Poly[oxy-1,2-ethanediyl(dimethyliminio)-1,2-ethanediyl(dimethyliminio)-1,2-ethanediyl chloride (1:2)]; 1,2-Ethanediaminium, N1-[2-[dimethyl[2-(octadecyloxy)-2-oxoethyl]ammonio]ethyl]-N1,N2,N2-trimethyl-N1,N2-bis[2-(octadecyloxy)-2-oxoethyl]-, chloride (1:3); 1,3-Propanediaminium, N1,N1,N1,N3,N3-pentamethyl-N3-(9Z)-9-octadecen-1-yl-, chloride (1:2); 1,12-Dodecanediaminium, N1,N1,N12,N12-tetramethyl-N1,N12-dioctyl-, bromide (1:2); 1,3-Propanediaminium, N1-[3-[bis(2-hydroxyethyl)methylammonio]propyl]-N1-[3-(dodecyloxy)-2-hydroxypropyl]-N1,N3-bis(2-hydroxyethyl)-N1,N3-dimethyl-, methyl sulfate (1:3); 1,3-Propanediaminium, N-[2-[(12-hydroxy-1-oxo-9-octadecenyl)amino]ethyl]-N,N,N',N',N'-pentamethyl-, dichloride, [R-(E)]- (9Cl); 1,12-Dodecanediaminium, N1,N1,N12,N12-tetramethyl-N1,N12-bis(phenylmethyl)-, chloride (1:2); 1,12-Dodecanediaminium, N1,N12-diethyl-N1,N1,N12,N12-tetramethyl-, bromide (1:2); 1,12-Dodecanediaminium, N1,N12-diethyl-N1,N1,N12,N12-tetramethyl-, chloride (1:2); Tallow Diamine tallow pentamethyl propylene diammonium hydrochloride (Duoquad T50, manufactured by Akzo) as a 50% solution in isopropanol; Amines, N-tallow alkyltrimethylenedia mines, ethoxylated; Dodecyl/tetradecyloxypropyl-1,3-diaminopropane.

In accordance with embodiments, the mono-quaternary amine compound can be a mono-quaternary amine compound having at least 8 carbons. For example, the mono-quaternary amine compound can be a long chain alkyl-ammonium compound with the alkyl radical having at least 8 carbons. In embodiments, the mono-quaternary amine can have at least 14 carbons. Any such known mono-quaternary compounds can be used. For example, suitable mono-quaternary amine compounds are disclosed in U.S. Patent Application Publication No. 2004/0185109, the relevant disclosure of which is incorporated herein by reference. For example, the mono-quaternary amine compound can be an ammonium cation that contains at least one linear or branched, saturated or unsaturated alkyl group having 12 to 22 carbon atoms. The remaining groups can be chosen from (a) linear or branched alkyl groups having 1 to 22 carbon atoms; (b) aralkyl groups which are benzyl and substitute benzyl moieties including fused ring moieties having linear or branched 1 to 22 carbon atoms in the alkyl portion of the structure; (c) aryl groups such as benzyl and substituted benzyl including fused ring aromatic substituents; (d) beta, gamma-unsaturated groups having size or less carbons or hydroalkyl groups having 2 to 6 carbon atoms; and (e) hydrogen.

Suitable mono-quaternary amines for intercalation in a clay are generally known in the art. The onium ions may generally be represented by the following formula:

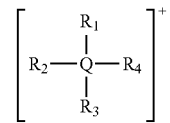

The preferred mono-quaternary amine compound agents for treating the clay can be one or more onium salt compounds, generally represented by the following formula:

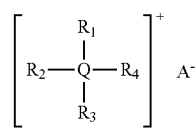

wherein Q=N, P, S;
wherein A=halide, acetate, methylsulfate, hydroxide, preferably chloride;
wherein $R_1$, $R_2$, $R_3$ and $R_4$ are independently organic moieties, or oligomeric moieties or hydrogen. U.S. Pat. No. 6,376,591 disclosed suitable compound, and the relevant disclosure is hereby incorporated by reference. Examples of useful organic moieties include, but not limited to, linear or branched alkyl, benzyl, aryl or aralkyl moieties having 1 to about 24 carbon atoms.

Suitable mon-quaternary amine compounds include, for example, bis(hydrogenated tallow alkyl)dimethyl ammonium chloride (Arquad® 2HT); benzylbis(hydrogenated tallow alkyl)methyl ammonium chloride (Arquad® M2HTB); di(ethyl tallowalkylate)dimethyl ammonium chloride (Arquad® DE-T); benzyl(hydrogenated tallow alkyl)dimethyl ammonium chloride (Arquad® DMHTB); trihexadecylmethyl ammonium chloride (Arquad® 316); tallowalkyl trimethyl ammonium chloride (Arquad® T-27W and Arquad® T-50); hexadecyl trimethyl ammonium chloride (Arquad® 16-29W and Arquad® 16-50); octadecyl trimethyl ammonium chloride (Arquad® 18-50(m)); and dimethylhydrogenated tallow-2-ethylhexyl ammonium methylsulfate; dimethyl di(C14-C18 alkyl) ammonium chloride (Adogen® 442 (EVONIK).

The onium ions may be functionalized such as protonated $\alpha,\varepsilon$-amino acid with the general formula $(H_3N-(CH_2)_n-COOH)$ Alkoxylated quaternary ammonium chloride compounds can include those disclosed in U.S. Pat. No. 5,366,647, the relevant disclosure of which is hereby incorporated by reference. Examples of suitable compounds can include cocoalkylmethylbis(2-hydroxyethyl) ammonium chloride (Ethoquad® C/12); octadecylmethyl[polyoxyethylene(15)] ammonium chloride (Ethoquad® 8/25); and octadecylmethyl (2-hydroxyethyl) ammonium chloride (Ethoquad 18/12).

The modified clay sorbents of the disclosure can further include one or more additives. Additives can include, for example, binders, dispersing aids, and functional additives. For example, the dispersing aid can be one or more of acrylic copolymers or biopolymers such as guar cum, xanthan cum, welan gum, cellulose, polysaccharides, starch, lactic acid, polyesters, citric acid/sodium bicarbonate, soy protein and combinations thereof. Binder can include any suitable binders, such as starch, superabsorbent polymers, and clay. Functional additives can include for example, one or more of activated carbon, anthracite, coke, organic-rich topsoil, organic-rich sediment, humus, apatite, zeolite, iron ore-rich material, organic shale, lime, gypsum, elemental sulfur, bauxite, fish meal, zero-valent iron and/or oxides or hydroxides of iron, manganese and/or aluminum and combinations thereof. Any other additives needed, for example, for a particular application or environment in which the modified clay sorbents are to be used can be included.

Methods of Sorbing PFAS with the Modified Clay Sorbents and Modified Clay Sorbent Blends In embodiments, the modified clay sorbents can be mixed with a PFAS contaminated soil to bind and immobilize the PFAS. In embodiments, the modified clay sorbents can be mixed with cement admixtures into PFAS contaminated soils to bind and immobilize the PFAS. In embodiments, the modified clay sorbents can be added to vessels and PFAS contaminated water or other sources can be pumped through the vessels to interact with the modified clay sorbent and remove PFAS from the water. In embodiments, the modified clay sorbents can be used in a treatment vessel in line with activated carbon, ion exchange resins, and other PFAS removal media vessels. In embodiments, the modified clay sorbent can be used in "slurry wall" construction to prevent underground spread of PFAS in ground water. In embodiments, the modified clay sorbent can be suspended in water and injected into a contaminated groundwater plume. In embodiments, the modified clay sorbent can be included in a geotextile mat for placement in or onto a contaminated source, such as in the bottoms of rivers, lakes, and oceans to prevent the spread of PFAS compound into larger bodies of water.

In embodiments in which the method include use of the modified clay sorbent having a blend of first and second modified clays, the blend can be provided as a single composition for single addition to the contaminated source. Alternatively, the first and second modified clays can be provided as separate components, for separate addition. In such embodiments, the first modified clay can be added simultaneously with the second modified clay. In embodiments, the first and second modified clays can be added sequentially in either order. The method can further include adding additional components, for example, a third modified clay. The third modified clay can be intercalated, for example, with a blend of mono-quaternary amine compound and di-quaternary amine compound.

In embodiments, a kit for sorption of PFAS can include a first modified clay intercalated with a mono-quaternary amine compound and a second modified clay intercalated with a di-quaternary amine compound. The kit can further include instructions for adding the first and second modified clays in a molar ratio of about 75:25 to about 5:95 or about 75:25 to about 50:50 mono-quaternary amine compound:di-quaternary amine compound. In other words, the kit can include instructions for addition of the components of the modified clay sorbet such that a total amount of di-quaternary amine compound added to the sample or environment is about 25 mol % to about 95 mol % of the total moles of quaternary amine compounds added to the sample or environment. For example the molar ratio of mono-quaternary amine compound: di-quaternary amine compound can be about 75:25 to about 50:50, about 80:20 to about 60:40, and about 75:25 to about 70:30, or about 40:60 to about 10:90. The molar ratio can include any of the foregoing described amounts of di-quaternary amine compound for the modified clay sorbents and modified clay sorbent blends. The kit can further include instructions for simultaneous or sequential addition of the first and second modified clays.

In embodiments, a kit for sorption of PFAS can include a modified clay sorbent that includes a single blended material containing a first modified clay intercalated with a mono-quaternary amine compound and a second modified clay intercalated with a di-quaternary amine compound. The kit can further include one or more additional modified clays, intercalated with one or more mono-quaternary amine compounds or one or more di-quaternary amine compounds. The kit can further include instructions for adding the one or more additional modified clays to the contaminated source simultaneously or sequentially with the modified clay sorbent blend, thereby allowing the molar ratio of mono-quaternary amine compound to di-quaternary amine compound to be modified on-site for a given contaminated source.

Method of Sorbing PFAS with a Clay Modified with A Di-Quaternary Amine Compound

In still further embodiments, a method of sorbing PFAS can include contacting a contaminated source with a clay sorbent having a clay intercalated with one or both of dequalinium chloride (referred to herein as Q1):

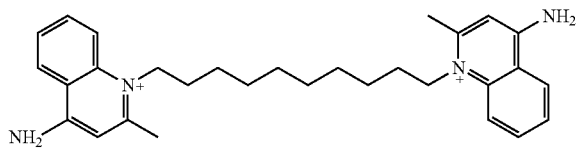

and a compound of formula I:

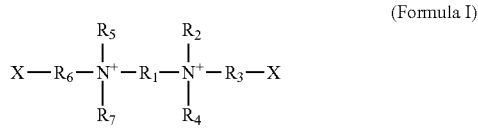

(Formula I)

wherein X is chloride and $R_1$ is an aliphatic radical having 1 to 13 carbons, and $R_2$, $R_3$, $R_4$, $R_5$, $R_6$, and $R_7$ are independently selected from aliphatic radicals and aromatic radicals, and at least one of $R_2$, $R_3$, $R_4$, $R_5$, $R_6$, and $R_7$ is an aliphatic radical or aromatic radical having 8 or more carbons. Optionally, the at least one of $R_2$, $R_3$, $R_4$, $R_5$, $R_6$, and $R_7$, can be an aliphatic tallow radical. For example, each of $R_2$, $R_3$, $R_4$, $R_5$, and $R_7$ can be method and $R_6$ can be an aliphatic tallow radical.

For example, the compound of formula I can be more specifically, a compound of formula (II) (referred to herein as Q4):

$$\{X-[R-\overset{CH3}{\underset{CH3}{N^+}}-CH2-CH2-CH2-\overset{CH3}{\underset{CH3}{N^+}}-CH3]X-\}$$

X = chloride
R = aliphatic tallow radical

For example, the compound of formula (I) can be Tallow Diamine pentamethyl propylene diammonium hydrochloride (57%).

It has been surprisingly found that clay modified with one or both of Q1 or Q4 sorbs PFAS compounds more effectively than clay modified with a mono-quaternary amine compound and the following multifunctional compounds:

Decamethonium Bromide (referred to herein as Q2):

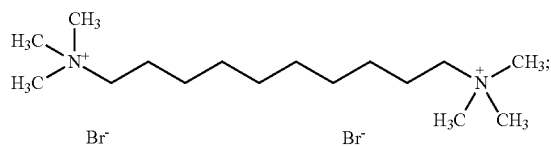

and
Hexamethonium Chloride (Q3)

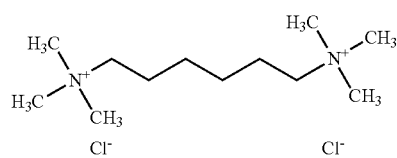

Figure 2:
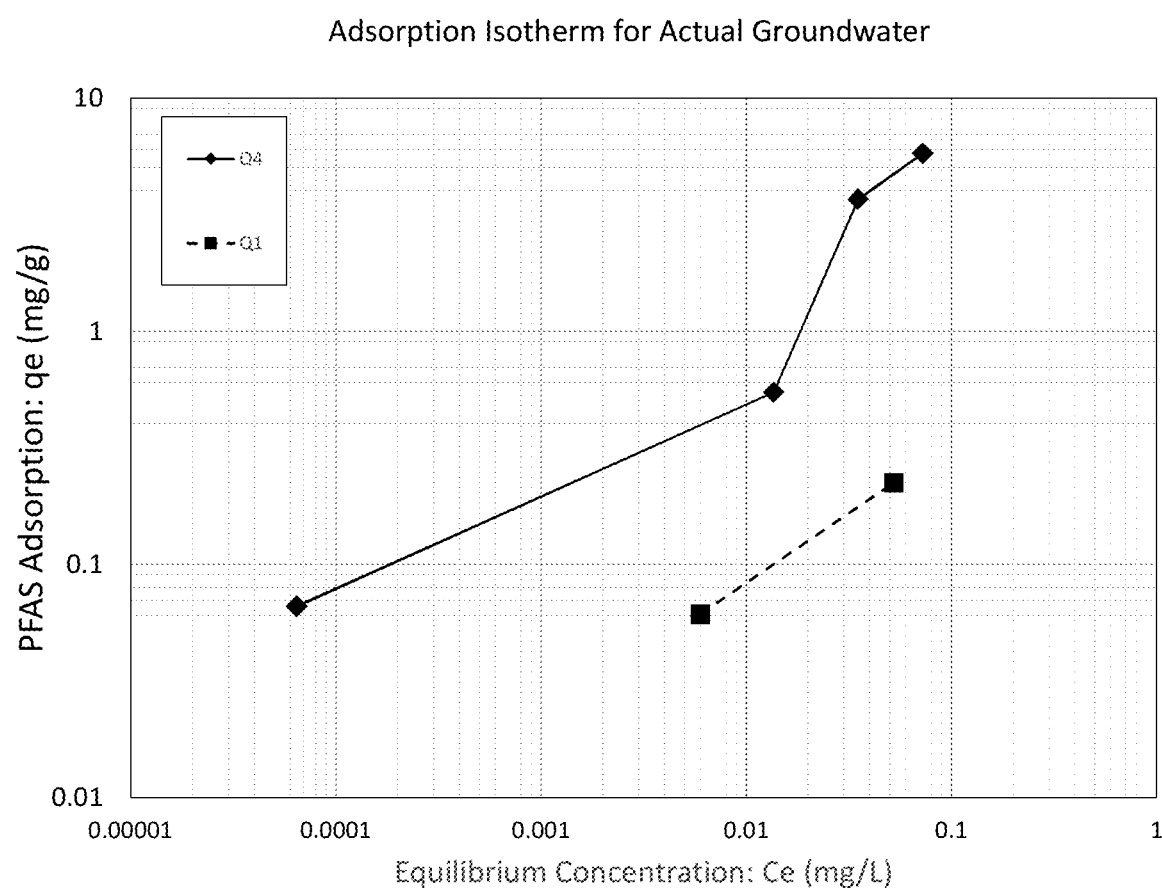
FIG. 2 is a graph showing the absorption isotherm of PFAS from compounds in accordance with the disclosure as tested in the actual groundwater sample.

As illustrated in FIG. 1, Q1 modified clay and Q4 modified clay removed three times or more PFAS as compared to Q2 and Q3 modified clays (comparative examples). FIG. 2 illustrates that the Q4 modified clay sorbs significantly more PFAS compound as compared to the Q1 modified clay, which indicates the structure of the di-quaternary ammonium compound may influence the adsorption capacity. In each of the examples of FIGS. 1 and 2, the clay was bentonite clay.

In any of the embodiments of methods of sorbing PFAS with the modified clay sorbent, the modified clay sorbent can be provided in a variety for forms. For example, the method can include flow-through vessels, reactive needle punched mats, rigid gabion, and batch processing. For example, the modified clay sorbents can be applied to a contaminated source as a reactive core mat, through in situ stabilization methods, through mixtures with cement and/or soil, and in pump and treat type applications. PFAS compounds can be sorbed at various stages of contamination. For example, modified clay sorbents can be applied at the source of the contamination, such as on the direct site of the application of a firefighting foam. Soil, groundwater, and surface water can also be contaminated by PFAS compounds and treatment can be at one or more of these sites. The methods of the disclosure can be tailored depending on the location and environment in which PFAS compound remediation is needed. For example, in embodiments, a dry granular mixture or reactive mat can be applied. In other embodiments, slurries and other wet applications can be used. Application methods can include solid mixing. In embodiments, this can include boring holes and/or trenches into the soil and dispensing the modified clay sorbets and mixing into the soil. Jet spraying applications can be used where slurries or other wet applications of the modified clay sorbents are useful.

For example, in embodiments a contaminated waste water stream or other waste environment can be treated by passing the contaminated water through a bed of modified clay sorbent. In embodiments, the contact time of the contaminated water with the bed of modified clay sorbent is at least 1 minute.

In embodiments, a method of sorbing PFAS compounds from a contaminated waste water stream or other waste environment can include contacting the contaminated water stream with a modified clay sorbent in a prepacked preamble mat or gabion.

In embodiments, a method of sorbing PFAS compounds from a contaminated waste water stream or other waste environment can include delivering a modified clay sorbent in a granular or powder form into a body of water, such that the modified clay sorbent forms a permeable reactive barrier layer.

In embodiments, a method of sorbing PFAS compounds from a contaminated waste water stream or other waste environment can include treating the contaminated water in a reaction vessel by mixing a modified clay tank with the contaminated water in the reaction vessel.

In embodiments, a method of sorbing PFAS compounds from a contaminated waste water stream or other waste environment can include suspending the modified clay in water an injecting into a contaminated groundwater plume.

EXAMPLES

Example 1

The following example demonstrates the formation of a hydrophobically modified montmorillonite clay using di-cationic molecules (referred to as "quats"). The compounds used in Samples 1 and 4 and Comparative Samples 2 and 3 are at least permanently di-cationic, which means they contain two permanently quaternary ammonium groups per molecule. In the case of dequalinium chloride of Sample 1, the molecule has two additional primary amine groups, which could also become protonated in water at neutral pH values, resulting in four cationic charges per molecule. The cationic compounds are listed in Table 1.

TABLE 1

List multi-cationic molecules

| Example No. | ID | Cationic Molecule | Approximate Chemical Formula | Supplier/Grade | CAS | Approximate Molar Mass |
|---|---|---|---|---|---|---|
| Sample 1 | Q1 | Dequalinium Chloride | C30H40Cl2N4 | Sigma Aldrich | 522-51-0 | 527.57 |
| Comparative Sample 2 | Q2 | Decamethonium Bromide | C16H38Br2N2 | Sigma Aldrich | 541-22-0 | 418.29 |
| Comparative Sample 3 | Q3 | Hexamethonium Chloride | C12H30Cl2N2 | Sigma Aldrich/ H2138 | 60-25-3 | 273.29 |
| Sample 4 | Q4 | Tallow Diamine pentamethy propylene diammonium hydrochloride (57%) | C25H35Cl2N2 | Evonik/Adogen 477D | 68607-29-4 | 434 |

Sample 1 and Comparative Samples 2 and 3 were prepared in water using a paddle type agitator. The clay used in the preparation of the examples was a natural sodium bentonite from Wyoming. The clay is Volclay API Gel NT which is a 200 mesh bentonite available from American Colloid Company (Hoffman Estates, Ill.).

Sample 1

5.08 grams of dequalinium chloride (Q1) was added to 116 milliliters of water and heated to 75-80° C. The mixture was dispersed using a mechanical paddle mixer as the quaternary amine compound is not readily water soluble. The clay (14.47 grams) was added to the solution in small increments over the course of 15 minutes. During the addition, the mixture became very thick. With continued mixing and clay addition, the viscosity decreased. The modified clay was isolated by filtration and rinsed with 200 mL of deionized water. The samples were dried in an air convection oven overnight at 80° C. The sample was then ground into a sub 250 mesh powder using a mortar and pestle.

Comparative Sample 2

5.00 grams of decamethonium bromide (Q2) was added to 147 milliliters of water and heated to 75-80° C. The mixture was dispersed using a mechanical paddle mixer as the quat is not readily water soluble. The clay (18.25 grams) was added to the solution in small increments over the course of 15 minutes. During the addition, the mixture became very thick. With continued mixing and clay addition, the viscosity decreased. The modified clay was isolated by filtration and rinsed with 200 mL of deionized water. The samples were dried in an air convection oven overnight at 80° C. The sample was then ground into a sub 250 mesh powder using a mortar and pestle.

Comparative Sample 3

5.00 grams of decamethonium bromide (Q3) was added to 222.9 milliliters of water and heated to 75-80° C. The mixture was dispersed using a mechanical paddle mixer as the quat is not readily water soluble. The clay (27.3 grams) was added to the solution in small increments over the course of 15 minutes. During the addition, the mixture became very thick. With continued mixing and clay addition, the viscosity decreased. The modified clay was isolated by filtration and rinsed with 200 mL of deionized water. The samples were dried in an air convection oven overnight at 80° C. The sample was then ground into a sub 250 mesh powder using a mortar and pestle.

Sample 4

The multi-cationic quat used in Example 4 was tallow diamine pentamethyl propylene diammonium hydrochloride, which is listed in Table 1 as Q4. The Q4 quat was purchased as a 57% active solution in a mixture of ethanol and water (ETOH:$H_2O$, 65:35) from Evonik (Adogen 477D). The clay is Volclay API Gel NT. No extra water was used in this example. Example 4 was prepared by combining the clay (800 grams) and the Q4 quat (474 grams) in a Kitchen Aid Stand mixer with a batter mixing paddle for 15 minutes. The mixture was then processed in a subsequent extrusion step using a Hobart meat grinder (model #4812). The sample was re-extruded two more times to ensure homogeneity. The modified clay was rinsed with 2000 mL of deionized water. The samples were dried in an air convection oven overnight at 80° C. The sample was then ground into a sub 250 mesh powder using a motorized grinder.

PFAS Removal Experiments

The removal efficiency was evaluated using a ground water sample obtained from am monitoring well located near a PFAS contaminated site. The samples were prepared as follows. 250 mL of parent PFAS water was added to a polypropylene screw cap vial. 300 mg of each sorbent was weighed and added to the vial. The vial was placed on an orbital shaker for 18 hours at 100 RPM. The samples were centrifuged prior to testing to remove suspended solids. The quantification of PFAS compounds in water was performed by the Colorado School of Mines by Liquid Chromatography Tandem Mass Spectrometry (LCMSMS).

TABLE 2

Quantification of PFAS compounds in the parent water sample.

| Analyte | Concentration (ng/L) |
|---|---|
| Perfluorobutanoic acid (PFBA) | 172 |
| Perfluoropentanoic acid (PFPeA) | 1720 |
| Perfluorohexanoic acid (PFHxA) | 4895 |
| Perfluoroheptanoic acid (PFHpA) | 724 |
| Perfluorooctanoic acid (PFOA) | 11427 |
| Perfluorononanoic acid (PFNA) | 78 |
| Perfluorobutanesulfonic acid (PFBS) | 223 |
| Perfluorohexane sulfonic acid (PFHxS) | 25061 |
| perfluoroheptanesulfonic acid (PFHpS) | 902 |
| perfluorooctane sulfonic acid (PFOS) | 22745 |
| 1H, 1H, 2H, 2H-perfluorohexane sulfonate (4:2 FTS) | 82 |
| Perfluorooctanesulfonamide (FOSA) | 790 |
| Perfluoro-n-[1, 2, 3, 4-13C4] octanoic acid (6:2 FTS-MPFOA) | 9580 |
| 1H, 1H, 2H, 2H-perfluorodecane sulfonate (8:2) | 826 |
| Perfluorobutyl sulfonate (PFPrS-MPFBS) | 51 |
| Total (ng/L) | 79276 |

The removal results for the individual PFAS compounds are shown below in Table 3. In table 3, the percent removal (% remov) is reported.

TABLE 3

Percent removal of specific PFAS compounds using di-quaternary ammonium compound modified clays Q1-Q4 at 300 mg in 250 mL of actual ground water

| | Parent PFAS Water (ng/L) | Q1 (ng/L) | Q2 (ng/L) | Q3 (ng/L) | Q4 (ng/L) | Q1 % remov. | Q2 % remov. | Q3 % remov. | Q4 % remov. |
|---|---|---|---|---|---|---|---|---|---|
| Perfluorobutanoic acid (PFBA) | 172 | 70 | 205 | 146 | 65 | 59% | −19% | 15% | 62% |
| Perfluoropentanoic acid (PFPeA) | 1,720 | 0 | 2,278 | 2,131 | 0 | 100% | −32% | −24% | 100% |
| Perfluorohexanoic acid (PFHxA) | 4,895 | 0 | 5,509 | 5,957 | 0 | 100% | −13% | −22% | 100% |
| Perfluoroheptanoic acid (PFHpA) | 724 | 0 | 1,300 | 1,047 | 0 | 100% | −80% | −45% | 100% |
| Perfluorooctanoic acid (PFOA) | 11,427 | 1,825 | 9,209 | 8,015 | 0 | 84% | 19% | 30% | 100% |
| Perfluorononanoic acid (PFNA) | 78 | 0 | 0 | 0 | 0 | 100% | 100% | 100% | 100% |
| Perfluorobutanesulfonic acid (PFBS) | | | | | | | | | |
| Perfluorohexane sulfonic acid (PFHxS) | 25,061 | 717 | 27,506 | 19,963 | 0 | 97% | −10% | 20% | 100% |
| perfluoroheptanesulfonic acid (PFHpS) | 902 | 0 | 798 | 395 | 0 | 100% | 12% | 56% | 100% |
| perfluorooctane sulfonic acid (PFOS) | 22,745 | 232 | 8,196 | 7,109 | 0 | 99% | 64% | 69% | 100% |
| 1H,1H,2H,2H-perfluorohexane sulfonate (4:2 FTS) | 82 | 0 | 102 | 106 | 0 | 100% | −25% | −29% | 100% |
| Perfluorooctanesulfon-amide (FOSA) | 790 | 0 | 163 | 499 | 0 | 100% | 79% | 37% | 100% |
| Perfluoro-n-[1,2,3,4-13C4]octanoic acid (6:2 FTS-MPFOA) | 9,580 | 3,096 | 10,395 | 10,325 | 0 | 68% | −9% | −8% | 100% |
| 1H,1H,2H,2H-perfluorodecane sulfonate (8:2 FTS) | 826 | 0 | 175 | 214 | 0 | 100% | 79% | 74% | 100% |
| Perfluorobutyl sulfonate (PFPrS-MPFBS) | 51 | 0 | 65 | 71 | 0 | 100% | −27% | −40% | 100% |

The total removal results are shown below in Table 4.

TABLE 4

Summary of the removal efficiencies of the 100% multi-quat clay systems

| Quat ID # | Treated Volume mL | Added Sorbent Mass mg | Parent PFAS Concentration ng/L | Total Residual PFAS Concentration ng/L | % Removal from Water % |
|---|---|---|---|---|---|
| Q1 | 250 | 300 | 79,276 | 5,970 | 92.5% |
| Q2 | 250 | 300 | 79,276 | 66,162 | 16.5% |
| Q3 | 250 | 300 | 79,276 | 56,271 | 29.0% |
| Q4 | 250 | 300 | 79,276 | 65 | 99.9% |

Example 2

Clay absorbents in accordance with embodiments of the disclosure having a clay functionalized with a mono-quaternary amine compound/di-quaternary amine compound blend were prepared using a solution process. The amounts of mono-quaternary amine compound and di-quaternary amine compound are shown in Table 6, below. Additionally, treatment of the clay to varying cationic exchange capacity was also tested and the CEC treat level for each sample is shown in Table 6, as well.

The modified clay was prepared as follows. A 1 liter metal cup was used to hold 700 ml of deionized water. The cup was placed on a hot plate equipped with an overhead stirrer. The water was heated to 70° C. and stirred at 200 RPM using a waring blade. The bentonite clay (Volcay API Gel NT) was added slowly in small increments, allowing time for hydration, and stirred for 10 minutes. The mono-quaternary amine compound and di-quaternary amine compound were weighed and added separately. Adogen® 442 (EVONIK), a dimethyl di(C14-C18 alkyl) ammonium chloride was used as the mono-quaternary amine compound. Adogen® 447 (EVONIK), a tallow diamine pentamethyl dichloride, was used as the di-quaternary amine compound. The mono-quaternary amine compound was added to the bentonite clay water mixture slowly and stirred for 10 minutes. The di-quaternary amine compound was added next, slowly, and mixed for 10 minutes. The sample was then stirred for two hours maintaining a temperature range of 70-75° C. The mixture was vacuum filtered and the solids were collected on a Whatman #1 filter paper. The solids were then rinsed with 1000 ml of water. The solids were collected and rinsed in 800 mL of deionized water, heated to a temperature of 60-65° C. The sample is stirred at 200 RPM for 4 hours. The solids were then vacuum filtered a second time and rinsed with 2500 mL of deionized water. The solids were then transferred to a glass dish and dried for 16 hours at 50° C. The material was then milled using a Retsch mill equipped with a 0.2 µm screen.

PFAS absorption testing was performed by adding 3 mg of the modified clay sorbent blend to a 500 ml water sample in a screw cap Nalgene® HDPE bottle and the bottle was placed on an orbital shaker at 10 RPM and mixed for 168 hours to approximate the adsorption equilibrium. In these tests, the PFAS water was prepared as opposed to obtained from a contaminated site. The PFAS water (LPPW) was prepared by dissolving perfluorobutanoic acid (PFBA), perfluorohexanoic acid (PFHxA), perfluorooctanoic acid (PFOA), perfluorobutanesulfonic acid (PFBS), perfluorohexanesulfonic acid (PHxS), perfluorooctane sulfonic acid (PFOS) in deionized (DI) water. The compounds were purchased from Wellington Laboratory in flame seal glass ampoules. The LPPW was prepared in a clean 5 gallon polypropylene pail equipped with a sealed lid. The PFAS compounds were delivered from the supplier as 50 ug/mL solutions in ethanol. The ampoules were opened and individual solutions transferred into the DI water using a glass transfer pipet. The water used was carefully weighed in 1000 gram increments totaling 15000 grams. The concentrations of the individual compounds of the LPPW are shown in table 5 and expressed as parts per billion (PPB) or µg/L.

TABLE 5

PFAS Water Components

| Analyte | Concentration (PPB) |
| --- | --- |
| Perfluorobutanoic acid (PFBA) | 11 |
| Perfluorohexanoic acid (PFHxA) | 17 |
| Perfluorooctanoic acid (PFOA) | 13 |
| Perfluorobutanesulfonic acid (PFBS) | 13 |
| Perfluorohexane sulfonic acid (PFHxS) | 12 |
| perfluorooctane sulfonic acid (PFOS) | 10 |
| Total (ng/L) | 76 |

TABLE 6

Modified Clay Sorbent Blends and PFAS Removal Performance

| Sample No. | Mono-quaternary amine compound % Mole | Di-quaternary amine compound % Mole | CEC Treat Level % | Total PFAS ppb | Short Chain PFAS (<C6) ppb | Long Chain PFAS ($\geq$C6) ppb | Regulated PFAS (PFNA, PFOA, PFOS, PHxS, PHpA) ppb |
| --- | --- | --- | --- | --- | --- | --- | --- |
| LPPW | — | — | — | 76 | 41 | 35 | 35 |
| M-3 | 100 | 0 | 88 | 61.2 | 37.5 | 23.7 | 23.7 |
| M-1 | 89 | 11 | 100 | 58 | 35.7 | 22.3 | 22.3 |
| M-4 | 86 | 14 | 89 | 57.4 | 37 | 20.4 | 20.4 |
| M-2 | 75 | 25 | 87 | 42.7 | 33 | 9.7 | 9.7 |
| M-6 | 50 | 50 | 88 | 42.2 | 27.7 | 14.5 | 14.5 |
| M-5 | 44 | 56 | 100 | 35.5 | 26.2 | 9.3 | 9.3 |

The PFAS removal testing results is illustrated in FIGS. 5-8. As illustrated in the figures, there is a dramatic increase in PFAS sorption of samples M-2, M-6, and M-5, which are in accordance with the modified clay sorbent blends of the disclosure to samples M-3, M-1, and M-4, which had lower amounts of di-quaternary amine compound.

Figure 8:
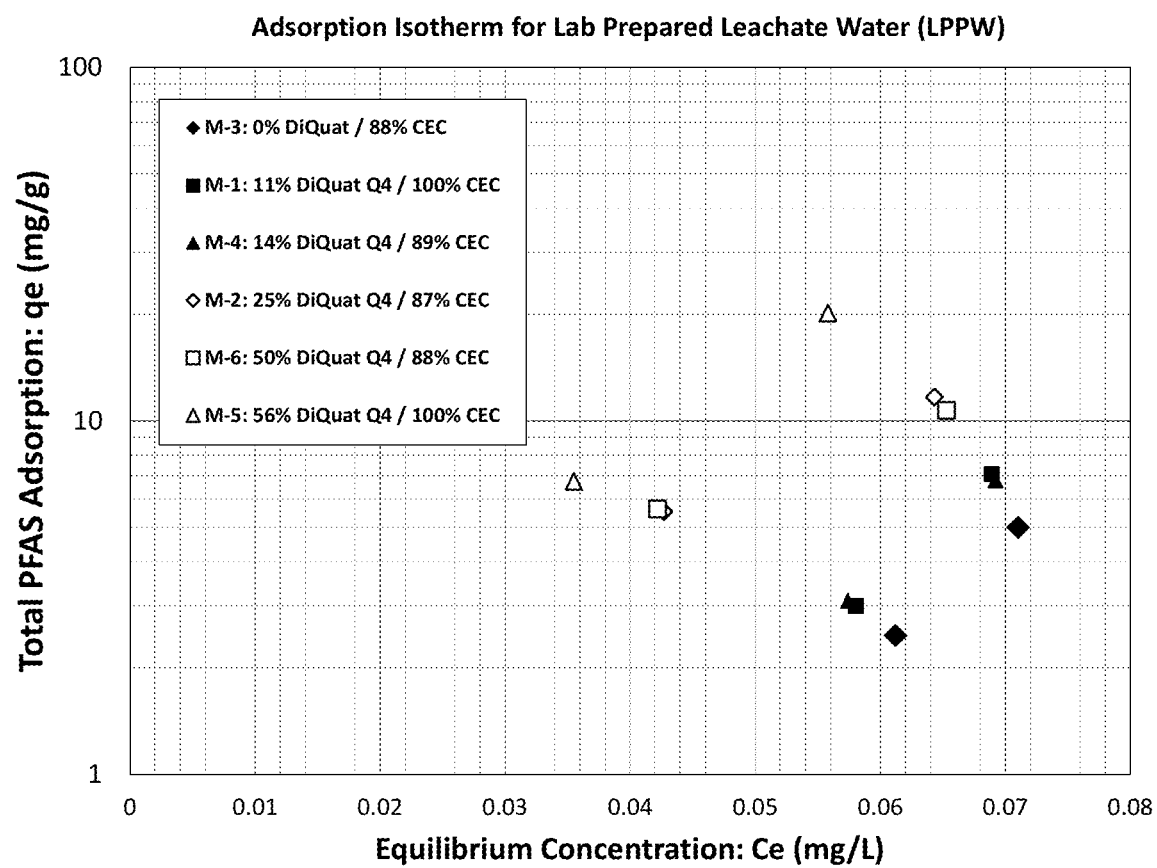
FIG. 8 is a graph showing the absorption isotherm of PFAS from compounds in accordance with the disclosure as tested in the lab prepared PFAS water.

As seen from FIG. 8, modified clay sorbents having 25 mol % or more di-quaternary amine had an increase of adsorption capacity of between 200% and 600% as compared to clays modified with 14 mol % di-quaternary amine compound or less. Modified clay sorbents in accordance with the disclosure (having greater than 25 mol % di-quaternary amine compound) tested in this example were capable of sorbing greater than 10 mg PFAS per gram of modified clay sorbent. The adsorption capacity was not exhausted in this testing.

Furthermore, a comparison of FIGS. 8 and FIG. 2 illustrates that the modified clay sorbents in accordance with the disclosure could also provide improved sorption capacity over compounds having 100% di-quaternary amine compound. In particular, samples M-5, M-6, and M-2 all demonstrate greater than 10 mg/g absorption capacity, as compared to the upper limit of about 10 mg/g adsorption capacity for the sorbents shown in FIG. 1. This is significant, as the sorption capacities of FIG. 1 are also considered well performing compounds in accordance with other embodiments of the disclosure and compounds which outperform other (e.g., Q2 and Q3) clay sorbents with 100% di-quaternary amine compound.

It was also surprisingly found that the clay sorbent blends of the disclosure absorbed sulfonate PFAS compounds at a significantly higher removal percentage than carboxylate PFAS compounds. It has been further found that mono-quaternary amine compound modified clays have a higher removal ability for carboxylated PFAS compound, as compared to the blends of the disclosure. Based on this understanding, it is contemplated herein that blends of clay modified with 100 mol % mono-quaternary amine compound can be used in conjunction with the modified clay sorbents of the disclosure having both mono-quaternary amine and di-quaternary amine compounds to develop a sorbent systems capable of more effectively sorbing both the carboxylated and sulfonated PFAS compounds. Further, it is contemplated herein that sorbent systems of the disclosure can be tailored for sorption of sulfated or carboxylated PFAS depending which type of PFAS is predominately present in the contaminated source.

Example 3

Clay absorbents in accordance with embodiments of the disclosure having a clay functionalized with a mono-quaternary amine compound/di-quaternary amine compound blend were prepared using a solution process. The amounts of mono-quaternary amine compound and di-quaternary amine compound are shown in Table 7, below. Additionally, treatment of the clay to varying cationic exchange capacity was also tested and the CEC treat level for each sample is shown in Table 7, as well.

The modified clay was prepared as follows. A 1 liter metal cup was used to hold 700 ml of deionized water. The cup was placed on a hot plate equipped with an overhead stirrer. The water was heated to 70° C. and stirred at 200 RPM using a waring blade. The bentonite clay (gdade) was added slowly in small increments, allowing time for hydration, and stirred for 10 minutes. The mono-quaternary amine compound and di-quaternary amine compound were weighed and added separately. Adogen® 442 (EVONIK), a dimethyl dehydrogenated tallow ammonium chloride was used as the mono-quaternary amine compound. Adogen® 477 (EVONIK), a tallow diamine pentamethyl dichloride, was used as the di-quaternary amine compound. The mono-quaternary amine compound was added to the bentonite clay water mixture slowly and stirred for 10 minutes. The di-quaternary amine compound was added next, slowly, and mixed for 10 minutes. The sample was then stirred for two hours maintaining a temperature range of 70-75° C. The mixture was vacuum filtered and the solids were collected on a Whatman #1 filter paper. The solids were then rinsed with 1000 ml of water. The solids were collected and rinsed in 800 mL of deionized water, heated to a temperature of 60-65° C. The sample is stirred at 200 RPM for 4 hours. The solids were then vacuum filtered a second time and rinsed with 2500 mL of deionized water. The solids were then transferred to a glass dish and dried for 16 hours at 50° C. The material was then milled using a Retsch mill equipped with a 0.2 µm screen.

PFAS absorption testing was performed by adding 30 mg of modified lay sorbent per 250 ml of contaminated water in a screw cap Nalgene® HDPE bottle, and the bottle was placed on an orbital shaker at 10 RPM and mixed for 18 hours. In these tests, the water sample was an actual contaminated ground water sample obtained from an air force base located in the domestic US as described above in table 2. The sample included a mixture of short chain PFAS compounds (compounds having less than 6 carbons), long chain PFAS compounds (compounds having 6 or more carbons), and regulated PFAS compounds (PFNA, PFOA, PFOS, PHxS, and PHpA).

TABLE 7

Modified Clay Sorbent Blends and PFAS Removal Results

| | Mono quat % Mole | Di-quaternary amine compound % Mole | CEC Treat Level % | Total PFAS ppb | Total PFAS Removal % | Short Chain PFAS ppb | Short Chain PFAS Removal % | Long Chain PFAS ppb | Long Chain PFAS Removal % | Reg. PFAS (PFNA, PFOA, PFOS, PHxS, PHpA) ppb | Reg. PFAS Removal % |
|---|---|---|---|---|---|---|---|---|---|---|---|
| Q-12 | 99 | 1 | 100 | 5.57 | 92.9 | 2.17 | 18.9 | 3.4 | 95.5 | 0.87 | 98.1 |
| Q-16 | 99 | 1 | 62.5 | 6.97 | 91.1 | 2.54 | 5.1 | 4.43 | 94.1 | 0.66 | 98.5 |
| Q-18 | 99 | 1 | 25 | 19.38 | 75.2 | 3.02 | 0 | 16.36 | 78.3 | 6.57 | 85.5 |
| Q-21 | 74.5 | 25.5 | 81.25 | 5.69 | 92.7 | 2.23 | 16.7 | 3.46 | 95.5 | 0.3 | 99.3 |
| Q-19 | 74.5 | 25.5 | 43.75 | 10.02 | 87.2 | 2.32 | 13.3 | 7.7 | 89.8 | 1.53 | 96.6 |
| Q-23 | 50 | 50 | 100 | 6.42 | 91.8 | 2.14 | 20 | 4.28 | 94.3 | 0.57 | 98.7 |
| Q-11 | 50 | 50 | 62.5 | 8.61 | 89.0 | 3.21 | 0 | 5.4 | 92.8 | 0.43 | 99.1 |
| Q-22 | 50 | 50 | 25 | 13.25 | 83.1 | 2.34 | 12.6 | 10.91 | 85.6 | 2.74 | 94.0 |
| Q-15 | 25.5 | 74.5 | 81.25 | 9.41 | 88.0 | 3.08 | 0 | 6.33 | 91.6 | 0.59 | 98.7 |
| Q-17 | 25.5 | 74.5 | 43.75 | 11.98 | 84.7 | 3.25 | 0 | 8.73 | 88.4 | 2.03 | 95.5 |
| Q-20 | 1 | 99 | 100 | 8.59 | 89.0 | 2.31 | 13.7 | 6.28 | 91.7 | 0.52 | 98.9 |
| Q-13 | 1 | 99 | 62.5 | 14.65 | 81.3 | 2.61 | 2.5 | 12.04 | 84.1 | 3.34 | 92.6 |
| Q-14 | 1 | 99 | 25 | 31.07 | 60.3 | 3.18 | 0 | 27.89 | 63.1 | 16.07 | 64.5 |

It was surprisingly found that the inclusion of 25 mol % or more di-quaternary amine compound, with modification of the claim to a CEC of greater than 50%, resulted in significantly improve removal of PFAS compounds, including short chain, long chain, and regulated compounds. In the field of PFAS removal, a 0.1 ppb difference in sorption performance is considered to be statistically and practically significant. As illustrated in the data above, samples Q-21, Q-23, Q-11, and Q-15, Q-21, and Q23 show statistically significant improvement in sorption over the comparative samples Q-12, Q-13, Q-14, Q-16, Q-17, Q-18, Q-19, Q-20, Q-22. A comparison of samples Q-12 to Q-21 illustrates that the addition of at least 25 mol % di-quaternary amine compound allowed for reduced amount of quaternary amine compounds (a CEC of 81.25% in Q-21 as compared to 100% in Q-12) while maintaining substantially the same sorption performance. As compared to Q-12, Q-21 only left 0.06 ppb more of short chain and long chain PFAS in the sample, and had a significant reduction of regulated PFAS removing 0.57 ppb more of the regulated compounds. A comparison of sample Q-20 to Q-21 illustrates that the beneficial improvement resulting from the blend trails off at above the upper limit of 95 mol %, with samples having 99% mold di-quaternary amine compound (Q-20), leaving 0.8 ppb more short chain PFAS, 2.82 ppb more of long chain PFAS, and 0.22 ppb more of regulated PFAS compounds, as compared to Q-21, despite having higher CEC % of 100%.

Aspects

Aspect 1. A modified clay sorbent for sorbing PFAS compounds from a contaminated environment, comprising:
a clay intercalated with one or more di-quaternary amine compounds and one or more mono-quaternary amine compounds,
wherein the one or more di-quaternary amine compounds are present in a mole percent of about 25 mol % to about 95 mol % based on total moles of quaternary amine compounds present in the modified clay sorbent.

Aspect 2. The modified clay sorbent of aspect 1, wherein the clay is intercalated with the one or more di-quaternary amine compounds and one or more mono-quaternary amine compounds to at least 50% of the a total cationic exchange capacity of the clay.

Aspect 3. A modified clay sorbent for sorbing PFAS compounds from a contaminated environment, comprising:
a first modified clay comprising a clay intercalated with the one or more mono-quaternary amine compounds; and
a second modified clay comprising a clay intercalated with the one or more di-quaternary amine compounds,
wherein second modified clay is present in the modified clay sorbent in an amount such that the one or more di-quaternary amine compounds are present in an amount of about 25 mol % to about 95 mol % based on total moles of quaternary amine compounds present in the modified clay sorbent.

Aspect 4. The modified clay sorbent of aspect 3, wherein the first modified clay and the second modified clay are each intercalated with the respective one or more mono-quaternary amine compounds and di-quaternary amine compounds to at least about 50% of the cationic exchange capacity of the respective first or second modified clay.

Aspect 5. The modified clay sorbent of any one of the preceding aspects, wherein the one or more di-quaternary amine compounds have 18 or more carbons.

Aspect 6. The modified clay sorbent of aspect 5, wherein the one or more di-quaternary amine compounds is one or more of dequalinium chloride and a compound of formula I:

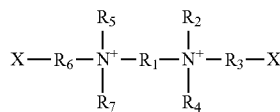

(Formula I)

wherein X is chloride and $R_1$ is an aliphatic radical having 1 to 13 carbons, and $R_2$, $R_3$, $R_4$, $R_5$, $R_6$, and $R_7$ are independently selected from aliphatic radicals and aromatic radicals, and at least one of $R_2$, $R_3$, $R_4$, $R_5$, $R_6$, and $R_7$ is an aliphatic radical or aromatic radical having 8 or more carbons, optionally where at least one of $R_2$, $R_3$, $R_4$, $R_5$, $R_6$, and $R_7$ is an aliphatic tallow radical.

Aspect 7. The modified clay sorbent of aspect 6, wherein the compound of formula I is tallow pentamethyl propylene diammonium hydrochloride.

Aspect 8. The modified clay sorbent of any one of the preceding aspects, wherein the one or more di-quaternary amine compounds are present in an amount of about 25 mol % to about 50 mol % based on the total moles of quaternary amine compounds in the modified clay sorbent.

Aspect 9. The modified clay sorbent of any one of the preceding aspects, wherein the clay is one or more of attapulgite, bentonite, montmorillonite, nontronite, beidellite, volkonskoite, hectorite, saponite, sauconite, sobockite, stevensite, svinfordite, vermiculite, palygorskite, kalonite, and sepiolite.

Aspect 10. The modified clay sorbent of any one of the preceding aspects, wherein the modified clay sorbent is present in a mat.

Aspect 11. The modified clay sorbent of any one of the preceding aspects, wherein the mono-functional quaternary amine is one or more of dimethyl di(C14-C18 alkyl) ammonium chloride.

Aspect 12. A kit comprising: the modified clay sorbent of any one of the preceding aspects and instructions for adding the clay sorbent to a contaminated environment for sorption of PFAS compounds.

Aspect 13. A kit comprising:
the modified clay sorbent of aspect 3, wherein the first and second modified clays are present as separate components, and
instructions for adding the first modified clay and the second modified clay individually to a contaminated environment to form the modified clay sorbent in amounts such that the one or more di-quaternary amine compounds are present in an amount of 25 mol % to about 95 mol % based on the total moles of quaternary amine compounds added to the contaminated environment.

Aspect 14. The kit of aspect 13, wherein the first and second modified clays are added in amounts such that the one or more di-quaternary amine compounds are present in an amount of 25 mol % to about 50 mol % based on the total moles of quaternary amine compounds added to the contaminated environment.

Aspect 15. The kit of aspect 13 or 14, wherein the first and second modified clays are added substantially simultaneously.

Aspect 16. The kit of aspect 13 or 14, wherein the first and second modified clays are added sequentially.

Aspect 17. A method of sorbing PFAS compounds from a contaminated environment, comprising:
admixing a modified clay sorbent with the contaminated enivironment, wherein the modified clay sorbent comprises a clay intercalated with one or more di-quaternary amine compounds, wherein the di-quaternary amine compound is dequalinium chloride and/or a compound of formula I

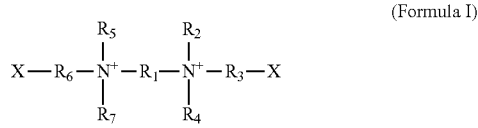

(Formula I)

wherein X is chloride and $R_1$ is an aliphatic radical having 1 to 13 carbons, and $R_2$, $R_3$, $R_4$, $R_5$, $R_6$, and $R_7$ are independently selected from aliphatic radicals and aromatic radicals, and at least one of $R_2$, $R_3$, $R_4$, $R_5$, $R_6$, and $R_7$ is an aliphatic radical or aromatic radical having 8 or more carbons, optionally where at least one of $R_2$, $R_3$, $R_4$, $R_5$, $R_6$, and $R_7$ is an aliphatic tallow radical.

Aspect 18. The method of aspect 17, wherein the modified clay sorbent is modified with the compound of formula (I).

Aspect 19. The method of aspect 18, wherein the compound of formula I is pentamethyl propylene diammonium hydrochloride.

Aspect 20. The method of any one of aspects 17 to 19, wherein the modified clay sorbent is bentonite modified with dequalinium chloride.

Aspect 21. The method of aspect 17, wherein the modified clay sorbent is modified with both dequalinium chloride and the compound of formula I.

Aspect 22. The method of aspect 21, wherein the compound of formula I is pentamethyl propylene diammonium hydrochloride.

Aspect 23. The method of any one of aspects 17 to 19, 21 and 22 wherein in the compound of formula I, $R_2$, $R_3$, $R_4$, $R_5$, and $R_7$ are each methyl and $R_6$ is an aliphatic tallow radical.

Aspect 24. The method of aspect 17 or 18, wherein the one or more di-quaternary amine compounds are the only functional-quaternary amine compounds present in the modified clay sorbent.

Aspect 25. A method of sorbing PFAS compounds from a contaminated environment, comprising:
  admixing a modified clay sorbent with the contaminated environment, wherein the modified clay sorbent comprises a clay intercalated with a one or more mono-quaternary amine compounds and one or more di-quaternary amine compounds, and the one or more di-quaternary amine compounds are present in an amount of about 25 mol % to about 95 mol % based on the total mole percent of the quaternary amine compounds in the modified clay sorbent.

Aspect 26. The method of aspect 25, wherein the clay is intercalated with the blend to a cationic exchange capacity of at least 50%.

Aspect 27. A method of sorbing PFAS compounds from a contaminated environment, comprising:
  admixing a modified clay sorbent with the contaminated environment, wherein the modified clay sorbent comprises a first modified clay comprising a clay intercalated with a one or more mono-quaternary amine compounds and a second modified clay comprising a clay intercalated with one or more di-quaternary amine compounds, wherein a ratio of an amount of the first modified clay to the amount of the second modified clay is selected such that the one or more di-quaternary amine compounds are present in an amount of about 25 mol % to about 95 mol % based on the total mole percent of the quaternary amine compounds admixed with the contaminated environment.

Aspect 28. The method of aspect 27, wherein each of the first modified clay and the second modified clay are intercalated to a cationic exchange capacity of the clay of at least 50%.

Aspect 29. The method of aspect 27 or 28, wherein the first and second modified clays are pre-blended in the modified clay sorbent such that the one or more di-quaternary amine compounds are present in an amount of about 20 mol % to about 50 mol % based on the total mole percent of the quaternary amine compounds in the modified clay sorbent blend and the first and second modified clays are admixed with the contaminated environment as a single composition.

Aspect 30. The method of aspect 27 or 28, wherein admixing the modified clay sorbent with the contaminated environment comprises separately adding the first modified clay and the second modified clay to the contaminated environment in amounts such that the one or more di-quaternary amine compounds are present in an amount of about 25 mol % to about 95 mol % based on the total mole percent of the quaternary amine compounds admixed with the contaminated environment.

Aspect 31. The method of aspect 30 wherein the first and second modified clays are added simultaneously.

Aspect 32. The method of aspect 30, wherein the first and second modified clays are added sequentially.

Aspect 33. The method of any one of aspects 25 to 32, wherein the one or more di-quaternary amine compounds comprises at least 18 carbons.

Aspect 34. The method of any one of aspects 25 to 33, wherein the one or more di-quaternary amine compounds are one or more of dequalinium chloride and a compound of formula I

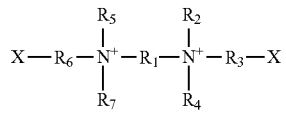

(Formula I)

wherein X is chloride and $R_1$ is an aliphatic radical having 1 to 13 carbons, and $R_2$, $R_3$, $R_4$, $R_5$, $R_6$, and $R_7$ are independently selected from aliphatic radicals and aromatic radicals, and at least one of $R_2$, $R_3$, $R_4$, $R_5$, $R_6$, and $R_7$ is an aliphatic radical or aromatic radical having 8 or more carbons, optionally where at least one of $R_2$, $R_3$, $R_4$, $R_5$, $R_6$, and $R_7$ is an aliphatic tallow radical.

Aspect 35. The method of aspect 34, wherein one or more di-quaternary amine compounds comprises the compound of formula I and the compound of formula I is tallow pentamethyl propylene diammonium hydrochloride.

Aspect 36. The method of any one of aspects 25 to 35, wherein the one or more di-quaternary amine compounds are present in an amount of about 25 mol % to about 50 mol % based on the total moles of quaternary amine compounds in the modified clay sorbent.

Aspect 37. The method of any one of aspects 17 to 36, wherein the clay is one or more of attapulgite, bentonite, montmorillonite, nontronite, beidellite, volkonskoite, hectorite, sapponite, sauconite, sobockite, stevensite, svinfordite, vermiculite, palygorskite, kalonite, and sepiolite.

Aspect 38. The method of any one of aspects 17 to 37, where the sorbent is capable of adsorbing at least 0.2 milligrams of PFAS compounds per gram of modified clay sorbent.

Aspect 39. The method of any one of aspects 17 to 38, wherein the environment is a contaminated soil, and the method comprises mixing the contaminated soil and the modified clay sorbent such that the modified clay sorbent is present in an amount of greater than about 0.5 wt % of the modified clay sorbent in the mixture.

Aspect 40. The method of any one of aspects 17 to 38, wherein the environment is a contaminated waste water stream, and the method comprises admixing the modified clay sorbent and the contaminated water stream by passing the contaminated water through a bed of the modified clay sorbent at a flow rate to maintain a contact time of the contaminated water with the bed of at least about 1 minute.

Aspect 41. The method of any one of aspects 17 to 38, wherein the modified clay sorbent is in the form of a prepacked permeable mat or gabion.

Aspect 42. The method of any one of aspects 17 to 38, wherein the modified clay sorbent in a granular or powder form into a body of water such that the modified clay forms a permeable reactive barrier layer.

Aspect 43. The method of any one of aspects 17 to 38, comprising the treatment of PFAS compounds from a contaminated water stream by mixing the modified clay and contaminated water in a tank.

Aspect 44. The method of any one of aspects 17 to 38, comprising the treatment of PFAS compounds from a contaminated water stream by injecting a suspension of the modified clay into contaminated soil and or a contaminated groundwater plume.

Aspect 45. The method of any one of aspects 17 to 43, wherein the contaminated environment is wastewater.

Aspect 46. The method of any one of aspects 17 to 43, wherein the contaminated environment is ground water.

While particular embodiments of the present invention have been shown and described in detail, it will be obvious to those skilled in the art that changes and modifications may be made without departing from the invention in its broader aspects. Therefore, the aim is to cover all such changes and modifications as fall within the true spirit and scope of the invention. The matters set forth in the foregoing description and accompanying drawings are offered by way of illustration only and not as limitations. The actual scope of the invention is to be defined by the subsequent claims when viewed in their proper perspective based on the prior art.

What is claimed:

1. A modified clay sorbent for sorbing PFAS compounds from a contaminated environment, comprising:
    a clay intercalated with one or more di-quaternary amine compounds and one or more mono-quaternary amine compounds,
    wherein the one or more di-quaternary amine compounds are present in a mole percent of about 25 mol % to about 95 mol % based on total moles of quaternary amine compounds present in the modified clay sorbent.

2. The modified clay sorbent of claim 1, wherein the clay is intercalated with the one or more di-quaternary amine compounds and one or more mono-quaternary amine compounds to at least 50% of the a total cationic exchange capacity of the clay.

3. A modified clay sorbent for sorbing PFAS compounds from a contaminated environment comprising:
    a first modified clay comprising a clay intercalated with one or more mono-quaternary amine compounds; and
    a second modified clay comprising a clay intercalated with one or more di-quaternary amine compounds,
    wherein second modified clay is present in the modified clay sorbent in an amount such that the one or more di-quaternary amine compounds are present in an amount of about 25 mol % to about 95 mol % based on total moles of quaternary amine compounds present in the modified clay sorbent.

4. The modified clay sorbent of claim 3, wherein the first modified clay and the second modified clay are each intercalated with the respective one or more mono-quaternary amine compounds and di-quaternary amine compounds to at least about 50% of the cationic exchange capacity of the respective first or second modified clay.

5. The modified clay sorbent of claim 1, wherein the one or more di-quaternary amine compounds have 18 or more carbons.

6. The modified clay sorbent of claim 5, wherein the one or more di-quaternary amine compounds is one or more of dequalinium chloride and a compound of formula I:

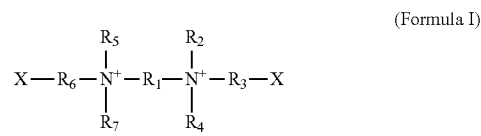

(Formula I)

wherein X is chloride and $R_1$, is an aliphatic radical having 1 to 13 carbons, and $R_2$, $R_3$, $R_4$, $R_5$, $R_6$, and $R_7$ are independently selected from aliphatic radicals and aromatic radicals, and at least one of $R_2$, $R_3$, $R_4$, $R_5$, $R_6$, and $R_7$ is an aliphatic radical or aromatic radical having 8 or more carbons.

7. The modified clay sorbent of claim 6, wherein the compound of formula I is pentamethyl propylene diammonium hydrochloride.

8. The modified clay sorbent of claim 1, wherein the one or more di-quaternary amine compounds are present in an amount of about 25 mol % to about 50 mol % based on the total moles of quaternary amine compounds in the modified clay sorbent.

9. The modified clay sorbent of claim 1, wherein the clay is one or more of attapulgite, bentonite, montmorillonite, nontronite, beidellite, volkonskoite, hectorite, saponite, sauconite, sobockite, stevensite, svinfordite, vermiculite, palygorskite, kalonite, and sepiolite.

10. The modified clay sorbent of claim 1, wherein the mono-functional quaternary amine is one or more of dimethyl di(C14-C18 alkyl) ammonium chloride.

11. A kit comprising: the modified clay sorbent of claim 1 and instructions for adding the clay sorbent to a contaminated environment for sorption of PFAS compounds.

12. A kit comprising:
    the modified clay sorbent of claim 3, wherein the first and second modified clays are present as separate components, and
    instructions for adding the first modified clay and the second modified clay individually to a contaminated environment to form the modified clay sorbent in amounts such that the one or more di-quaternary amine compounds are present in an amount of 25 mol % to about 95 mol % based on the total moles of quaternary amine compounds added to the contaminated environment.

13. A method of sorbing PFAS compounds from a contaminated environment, comprising:
    admixing a modified clay sorbent with the contaminated environment, wherein the modified clay sorbent comprises a clay intercalated with one or more mono-quaternary amine compounds and one or more di-quaternary amine compounds, and the one or more di-quaternary amine compounds are present in an amount of about 25 mol % to about 95 mol % based on the total mole percent of the quaternary amine compounds in the modified clay sorbent.

14. The method of claim 13, wherein the clay is intercalated with the one or more di-quaternary amine compounds and one or more mono-quaternary amine compounds to at least 50% of a total cationic exchange capacity of the clay.

15. A method of sorbing PFAS compounds from a contaminated environment, comprising:

admixing a modified clay sorbent with the contaminated environment, wherein the modified clay sorbent comprises a first modified clay comprising a clay intercalated with a one or more mono-quaternary amine compounds and a second modified clay comprising a clay intercalated with one or more di-quaternary amine compounds, wherein a ratio of an amount of the first modified clay to the amount of the second modified clay is selected such that the one or more di-quaternary amine compounds are present in an amount of about 25 mol % to about 95 mol % based on the total mole percent of the quaternary amine compounds admixed with the contaminated environment.

16. The method of claim 15, wherein each of the first modified clay and the second modified clay are intercalated to a cationic exchange capacity of the clay of at least 50%.

17. The method of claim 15, wherein the first and second modified clays are pre-blended in the modified clay sorbent such that the one or more di-quaternary amine compounds are present in an amount of about 25 mol % to about 50 mol % based on the total mole percent of the quaternary amine compounds in the modified clay sorbent blend and the first and second modified clays are admixed with the contaminated environment as a single composition.

18. The method of claim 13, wherein the one or more di-quaternary amine compounds comprises at least 18 carbons.

19. The method of claim 13, wherein the one or more di-quaternary amine compounds are one or more of dequalinium chloride and a compound of formula I

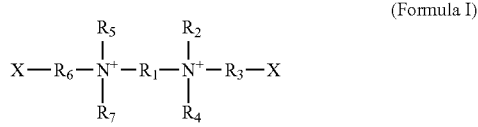

(Formula I)

wherein X is chloride and $R_1$, is an aliphatic radical having 1 to 13 carbons, and $R_2$, $R_3$, $R_4$, $R_5$, $R_6$, and $R_7$ are independently selected from aliphatic radicals and aromatic radicals, and at least one of $R_2$, $R_3$, $R_4$, $R_5$, $R_6$, and $R_7$ is an aliphatic radical or aromatic radical having 8 or more carbons.

20. The method of claim 19, wherein one or more di-quaternary amine compounds comprises the compound of formula I and the compound of formula I is tallow pentamethyl propylene diammonium hydrochloride.

21. The method of claim 13, wherein the one or more di-quaternary amine compounds are present in an amount of about 25 mol % to about 50 mol % based on the total moles of quaternary amine compounds in the modified clay sorbent.

22. The method of claim 13, wherein the clay is one or more of attapulgite, bentonite, montmorillonite, nontronite, beidellite, volkonskoite, hectorite, sapponite, sauconite, sobockite, stevensite, svinfordite, vermiculite, palygorskite, kalonite, and sepiolite.

23. The method of claim 13, where the sorbent is capable of adsorbing at least 0.2 milligrams of PFAS compounds per gram of modified clay sorbent.

24. The method of claim 13, wherein the contaminated environment is a contaminated soil, and the method comprises mixing the contaminated soil and the modified clay sorbent such that the modified clay sorbent is present in an amount of greater than about 0.5 wt % of the modified clay sorbent in the mixture.

25. The method of claim 13, wherein the contaminated environment is a contaminated waste water stream, and the method comprises admixing the modified clay sorbent and the contaminated water stream by passing the contaminated water through a bed of the modified clay sorbent at a flow rate to maintain a contact time of the contaminated water with the bed of at least about 1 minute.

26. The method of claim 13, wherein the modified clay sorbent is in the form of a prepacked permeable mat or gabion.

27. The method of claim 13, wherein the modified clay sorbent in a granular or powder form into a body of water such that the modified clay forms a permeable reactive barrier layer.

28. The method of claim 13, comprising the treatment of PFAS compounds from a contaminated water stream by mixing the modified clay and contaminated water in a tank.

29. The method of claim 13, comprising the treatment of PFAS compounds from a contaminated water stream by injecting a suspension of the modified clay into contaminated soil and or a contaminated groundwater plume.

30. The method of claim 13, wherein the contaminated environment is wastewater or ground water.

* * * * *